(12) United States Patent
Wang et al.

(10) Patent No.: US 11,750,352 B2
(45) Date of Patent: *Sep. 5, 2023

(54) FEEDBACK INFORMATION PROCESSING METHOD, DEVICE AND SYSTEM, AND BASE STATION AND TERMINAL

(71) Applicant: ZTE CORPORATION, Guangdong (CN)

(72) Inventors: Mingyue Wang, Guangdong (CN); Feng Xie, Guangdong (CN); Zhifeng Yuan, Guangdong (CN)

(73) Assignee: ZTE Corporation, Shenzhen (CN)

( * ) Notice: Subject to any disclaimer, the term of this patent is extended or adjusted under 35 U.S.C. 154(b) by 31 days.

This patent is subject to a terminal disclaimer.

(21) Appl. No.: 17/328,999

(22) Filed: May 24, 2021

(65) Prior Publication Data

US 2021/0297224 A1    Sep. 23, 2021

Related U.S. Application Data

(63) Continuation of application No. 16/337,875, filed as application No. PCT/CN2017/101909 on Sep. 15, 2017, now Pat. No. 11,050,541.

(30) Foreign Application Priority Data

Sep. 28, 2016    (CN) .......................... 201610859511.8

(51) Int. Cl.
*H04L 1/16*    (2023.01)
*H04L 5/00*    (2006.01)
(Continued)

(52) U.S. Cl.
CPC .......... *H04L 5/0055* (2013.01); *H04L 1/1607* (2013.01); *H04W 28/04* (2013.01); *H04W 80/02* (2013.01)

(58) Field of Classification Search
CPC ......... H04L 1/00; H04L 1/004; H04L 1/0073; H04L 1/16; H04L 1/1607; H04L 1/1671; H04L 5/0055; H04W 28/04; H04W 80/02
See application file for complete search history.

(56) References Cited

U.S. PATENT DOCUMENTS

| | | | | |
|---|---|---|---|---|
| 2002/0057666 A1* | 5/2002 | Hamabe | ................ | H04W 52/08 370/345 |
| 2007/0171849 A1* | 7/2007 | Zhang | ................... | H04L 1/0026 370/310 |

(Continued)

FOREIGN PATENT DOCUMENTS

| | | |
|---|---|---|
| CN | 101340271 A | 1/2009 |
| CN | 101883387 A | 11/2010 |

(Continued)

OTHER PUBLICATIONS

First Search Report for CN 201610859511.8.
(Continued)

*Primary Examiner* — Melvin C Marcelo
*Assistant Examiner* — Natali Pascual Peguero
(74) *Attorney, Agent, or Firm* — Knobbe, Martens, Olson & Bear, LLP

(57) ABSTRACT

Provided are a feedback information processing method, device and system, a base station and a terminal. The method includes: multiplexing, by a first node, feedback information for a plurality of second nodes in a media access control protocol data unit (MAC PDU), where the feedback information is information generated after the first node correctly receives transmission blocks from the second nodes, and the feedback includes a plurality of pieces of bit information. After the first node multiplexes the feedback information for the plurality of second nodes in the MAC PDU, a radio network temporary identifier (RNTI) is used in a process (Continued)

---

Multiplexing, by a first node, feedback information for a plurality of second nodes in a media access control protocol data unit (MAC PDU), where the feedback information is information generated after the first node correctly receives transmission blocks from the second nodes, and the feedback includes a plurality of pieces of bit information ⸺ S102 that the first node delivers the feedback information to the plurality of second nodes.

14 Claims, 13 Drawing Sheets

(51) Int. Cl.
*H04W 28/04* (2009.01)
*H04L 1/1607* (2023.01)
*H04W 80/02* (2009.01)

(56) References Cited

U.S. PATENT DOCUMENTS

| | | | |
|---|---|---|---|
| 2009/0196366 | A1 | 8/2009 | Shen et al. |
| 2010/0061350 | A1 | 3/2010 | Flammer, III |
| 2010/0290548 | A1 | 11/2010 | Hoshino et al. |
| 2011/0235593 | A1 | 9/2011 | Gong et al. |
| 2013/0301625 | A1 | 11/2013 | Thoukydides et al. |
| 2015/0215813 | A1 | 7/2015 | Flammer, III |
| 2015/0237649 | A1 | 8/2015 | Zhang et al. |
| 2016/0127020 | A1* | 5/2016 | Abraham ............ H04B 7/0452 370/312 |
| 2016/0165479 | A1 | 6/2016 | Flammer, III |
| 2016/0198453 | A1* | 7/2016 | Hu ..................... H04W 24/02 370/349 |

FOREIGN PATENT DOCUMENTS

| | | |
|---|---|---|
| CN | 102204145 A | 9/2011 |
| CN | 102299778 A | 12/2011 |
| CN | 102412944 A | 4/2012 |
| CN | 103841603 A | 6/2014 |
| CN | 103973413 A | 8/2014 |
| CN | 104662977 A | 5/2015 |
| CN | 106576249 A | 4/2017 |
| CN | 106576249 B | 11/2019 |
| WO | WO 2016073477 A1 | 5/2016 |
| WO | WO 2017/015911 A1 | 2/2017 |

OTHER PUBLICATIONS

First Office Action for CN 201610859511.8.
Notice of Rejection for Chinese Application No. 201610859511.8 dated Apr. 2, 2022.
International Search Report dated Nov. 29, 2017 for International Application No. PCT/CN2017/101909, 5 pages.
Written Opinion of the International Searching Authority dated Nov. 29, 2017 for International Application No. PCT/CN2017/101909, 3 pages.
Supplementary European Search Report dated Mar. 30, 2020 for EP Application No. 17854700.6, 7 pages.
TR 25.990 V2.0.0 (Oct. 1999), $3^{rd}$ Generation Partnership Project (3GPP); Technical Specification Group (TSG) RAN; Vocabulary, Technical Specification Group, Radio Access Network Meeting #5, Korea, Oct. 6-8, 1999.
R1-073310 "FEC Code Block-based CRC", 3GPP TSG-RAN Working Group 1 Meeting #50 Athens, Greece, Aug. 20-24, 2007.
Chinese Supplemental Search Report for Chinese Application No. 2016108595118, dated Dec. 7, 2021.
Chinese Second Office Action for Chinese Application No. 201610859511.8, dated Dec. 15, 2021.

* cited by examiner

Multiplexing, by a first node, feedback information for a plurality of second nodes in a media access control protocol data unit (MAC PDU), where the feedback information is information generated after the first node correctly receives transmission blocks from the second nodes, and the feedback includes a plurality of pieces of bit information ⟋ S102

FIG. 1

Sending transmission blocks from a plurality of second nodes to a first node ⟋ S202

Receiving a media access control protocol data unit (MAC PDU) sent from the first mode, where the MAC PDU is obtained through multiplexing feedback information for the plurality of second nodes in one MAC PDU by the first node, the feedback information is information generated after the first node correctly receives the transmission blocks, and the feedback information includes a plurality of pieces of bit information ⟋ S204

FIG. 2

FEEDBACK INFORMATION PROCESSING METHOD, DEVICE AND SYSTEM, AND BASE STATION AND TERMINAL

CROSS-REFERENCES TO RELATED APPLICATIONS

The present application is a continuation of and claims benefit of priority to U.S. non-Provisional application Ser. No. 16/337,875 titled "FEEDBACK INFORMATION PROCESSING METHOD, DEVICE AND SYSTEM, BASE STATION AND TERMINAL" and filed on Mar. 28, 2019, which claims priority to International Patent Application No. PCT/CN2017/101909, filed Sep. 15, 2017, and Chinese Patent Application No. 201610859511.8, filed Sep. 28, 2016, each of which is hereby incorporated by reference in its entirety as though fully and completely set forth herein.

TECHNICAL FIELD

The present disclosure relates to communications and, in particular, to a feedback information processing method, device and system, a base station and a terminal.

BACKGROUND

Mobile communications is developing from the connection between people and people to the connection between people and things and between things and things, and the Internet of Everything is entering our lives in an extremely fast pace. IoT applications, such as Internet of Vehicles, smart reading meters, smart healthcare, smart home and smart wearable devices, will generate massive connections, far exceeding the communication requirements between people and people. In order to implement the real Internet of Everything technology, the reduction of power consumption of access devices and the implementation of massive connections have always been the focus of current research.

In order to meet demands for the low power consumption and the massive connections, in the related art, a plurality of users transmitting respective data using the same time-frequency resource is allowed, and the data of some users may be successfully received by a base station, but the data of other users may not be correctly parsed by the base station. For a user of a successful transmission or a failed transmission, the base station needs to provide corresponding feedback information. However, no corresponding technical solution is proposed in the related art.

SUMMARY

Embodiments of the present disclosure provide a feedback information processing method, device and system, a base station and a terminal, to at least solve the problem in the related art of, in the situation where a plurality of users transmitting respective data using the same time-frequency resource is allowed, and the data of some users may be successfully received by a base station while the data of other users may not be correctly parsed by the base station, the base station is able to provide corresponding feedback information for a user of a successful transmission or a failed transmission.

According to an embodiment of the present disclosure, a feedback information processing method is provided. The method includes: multiplexing, by a first node, feedback information for a plurality of second nodes in a media access control protocol data unit (MAC PDU), where the feedback information is information generated after the first node correctly receives transmission blocks from the second node, and the feedback includes a plurality of pieces of bit information.

Optionally, after the first node multiplexes the feedback information for the plurality of second nodes in the MAC PDU, a radio network temporary identifier (RNTI) is used in a process that the first node delivers the feedback information to the plurality of second nodes, where the RNTI is calculated according to a time domain location of a physical uplink shared channel (PUSCH) where the transmission blocks correctly received by the first node are located.

Optionally, the first node forms feedback information for each of the plurality of second nodes into a media access control (MAC) control element (CE), or forms the feedback information for the plurality of second nodes into a protocol data unit (PDU).

Optionally, the bit information includes: cyclic redundancy check (CRC) check bits generated by the transmission blocks correctly received by the first node.

Optionally, the CRC check bits include: the CRC check bits generated by all bits in the transmission blocks correctly received by the first node, or the CRC check bits generated by part bits in the transmission blocks correctly received by the first node.

Optionally, the CRC check bits generated by part bits in the transmission blocks correctly received by the first node are bits whose correlation between different users is lower than a preset threshold.

Optionally, the bit information includes at least one of: identification information corresponding to the transmission blocks, and all data information or part data information in the correctly received transmission block.

Optionally, the bit information is formed by spread spectrum sequences adopted by the first node.

Optionally, the bit information includes at least one of: the identification information and the data information.

According to an embodiment of the present disclosure, a feedback information receiving method is provided. The method includes: sending transmission blocks from a plurality of second nodes to a first node, and receiving an MAC PDU sent from the first mode, where the MAC PDU is obtained through multiplexing feedback information for the plurality of second nodes in one MAC PDU by the first node, the feedback information is information generated after the first node correctly receives the transmission blocks, and the feedback information includes a plurality of pieces of bit information.

Optionally, the bit information includes at least one of: identification information and data information.

According to another embodiment of the present disclosure, a feedback information processing device is provided. The device is applied to a first node and includes: a multiplexing module, which is configured to multiplex feedback information for a plurality of second nodes in an MAC PDU, where the feedback information is information generated after the first node correctly receives transmission blocks from the second node, and the feedback includes a plurality of pieces of bit information.

Optionally, the bit information includes: CRC check bits generated by the transmission blocks correctly received by the first node.

Optionally, the CRC check bits include: the CRC check bits generated by all bits in the transmission blocks correctly received by the first node, or the CRC check bits generated by part bits in the transmission blocks correctly received by the first node.

Optionally, the CRC check bits generated by part bits in the transmission blocks correctly received by the first node are bits whose correlation between different users is lower than a preset threshold.

Optionally, the bit information includes at least one of: identification information corresponding to the transmission blocks, and all data information or part data information in the correctly received transmission block.

Optionally, the device further includes: a delivering module, which is configured to, after the multiplexing module multiplexes the feedback information for the plurality of second nodes in the MAC PDU, use an RNTI in a process that the feedback information is delivered to the plurality of second nodes, where the RNTI is calculated according to a time domain location of a PUSCH where the transmission blocks correctly received by the first node are located.

According to another embodiment of the present disclosure, another feedback information processing method is provided. The device includes: a sending module, which is configured to send transmission blocks from a plurality of second nodes to a first node; and a receiving module, which is configured to receive an MAC PDU sent from the first mode, where the MAC PDU is obtained through multiplexing feedback information for the plurality of second nodes in one MAC PDU by the first node, the feedback information is information generated after the first node correctly receives the transmission blocks, and the feedback information includes a plurality of pieces of bit information.

Optionally, the bit information includes at least one of: identification information, information related to the identification information, data information, and information related to the data information.

According to another embodiment of the present disclosure, a feedback information processing system is provided. The system includes a first node and a second node. The first node includes: a receiving module, which is configured to receive transmission blocks sent from the second node, and a multiplexing module, which is configured to multiplex feedback information for a plurality of second nodes in an MAC PDU, where the feedback information is information generated after the first node correctly receives the transmission blocks from the second node, and the feedback includes a plurality of pieces of bit information. The second node includes a sending module which is configured to send the transmission blocks to the first node.

Optionally, the bit information includes at least one of: identification information corresponding to the transmission blocks, and all data information or part data information in the correctly received transmission block.

Optionally, the first node further includes: a delivering module, which is configured to, after the multiplexing module multiplexes the feedback information for the plurality of second nodes in the MAC PDU, use an RNTI in a process that the feedback information is delivered to the plurality of second nodes, where the RNTI is calculated according to a time domain location of a PUSCH where the transmission blocks correctly received by the first node are located.

According to another embodiment of the present disclosure, a base station is provided. The base station includes a processor and a memory storing processor-executable instructions. When the instructions are executed by the processor, the processor executes a following operation: multiplexing feedback information for a plurality of terminals in an MAC PDU, where the feedback information is information generated after the base station correctly receives transmission blocks from the terminal, and the feedback includes a plurality of pieces of bit information.

Optionally, the bit information includes at least one of: identification information corresponding to the transmission blocks, and all data information or part data information in the correctly received transmission block.

Optionally, after the feedback information for the plurality of terminals is multiplexed in the MAC PDU, the processor further executes a following operation: using an RNTI in a process that the feedback information is delivered to the plurality of terminals, where the RNTI is calculated according to a time domain location of a PUSCH where the transmission blocks correctly received by the base station are located.

According to another embodiment of the present disclosure, a terminal is provided. The terminal includes a processor and a memory storing processor-executable instructions. When the instructions are executed by the processor, the processor executes a following operation: multiplexing feedback information for a plurality of terminals in an MAC PDU, where the feedback information is information generated after the terminal correctly receives transmission blocks from the base station, and the feedback includes a plurality of pieces of bit information. Optionally, the bit information includes at least one of: identification information corresponding to the transmission blocks, and all data information or part data information in the correctly received transmission block.

Optionally, after the feedback information for the plurality of base stations is multiplexed in the MAC PDU, the processor further executes a following operation: using an RNTI in a process that the feedback information is delivered to the plurality of base stations, where the RNTI is calculated according to a time domain location of a PUSCH where the transmission blocks correctly received by the terminal are located.

Optionally, the bit information includes: CRC check bits generated by the transmission blocks correctly received by the terminal.

Optionally, the CRC check bits include: the CRC check bits generated by all bits in the transmission blocks correctly received by the terminal, or the CRC check bits generated by part bits in the transmission blocks correctly received by the terminal.

According to another embodiment of the present disclosure, a storage medium is further provided. The storage medium is configured to store program codes for executing the step described below.

Feedback information for a plurality of second nodes is multiplexed in an MAC PDU, where the feedback information is information generated after the first node correctly receives transmission blocks from the second node, and the feedback includes a plurality of pieces of bit information.

Through the present disclosure, a first node multiplexes feedback information for a plurality of second nodes in an MAC PDU, where the feedback information is information generated after the first node correctly receives transmission blocks from the second node, and the feedback includes a plurality of pieces of bit information. In the related art, a plurality of users transmitting respective data using the same time-frequency resource is allowed, and the data of some users may be successfully received by a base station, but the data of other users may not be correctly parsed by the base station. The technical solution solves the problem of a base station being able to provide corresponding feedback information for a user of a successful transmission or a failed transmission.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings:

FIG. 1 is a flowchart of a feedback information processing method according to an embodiment of the present disclosure;

FIG. 2 is a flowchart of a feedback information receiving method according to the embodiment of the present disclosure;

DETAILED DESCRIPTION

Figure 3:
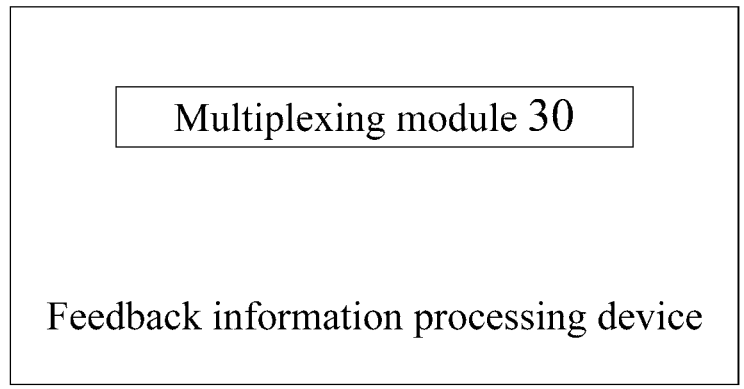
FIG. 3 is a block diagram of a feedback information processing device according to an embodiment of the present disclosure.

The present disclosure will be described hereinafter in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

The embodiment provides a feedback information processing method. FIG. 1 is a flowchart of a feedback information processing method according to an embodiment of the present disclosure. As shown in FIG. 1, the method includes steps described below.

In step S102, a first node multiplexes feedback information for a plurality of second nodes in a media access control protocol data unit (MAC PDU), where the feedback information is information generated after the first node correctly receives transmission blocks from the second node, and the feedback includes a plurality of pieces of bit information.

Through the step described above, the first node multiplexes the feedback information for the plurality of second nodes in the MAC PDU, where the feedback information is information generated after the first node correctly receives the transmission blocks from the second node, and the feedback includes the plurality of pieces of bit information. In the related art, a plurality of users transmitting respective data using the same time-frequency resource is allowed, and the data of some users may be successfully received by a base station, but the data of other users may not be correctly parsed by the base station. The technical solution solves the problem of a base station being able to provide corresponding feedback information for a user of a successful transmission or a failed transmission.

Optionally, the step described above may, but may not necessarily, be executed by a base station, a terminal or a system.

Optionally, after the first node multiplexes the feedback information for the plurality of second nodes in the MAC PDU, a radio network temporary identifier (RNTI) is used in a process that the first node delivers the feedback information to the plurality of second nodes, where the RNTI is calculated according to a time domain location of a physical uplink shared channel (PUSCH) where the transmission blocks correctly received by the first node are located.

The bit information includes: cyclic redundancy check (CRC) check bits generated by the transmission blocks correctly received by the first node. The CRC check bits include: CRC check bits generated by all bits in the transmission blocks correctly received by the first node, or CRC check bits generated by part bits in the transmission blocks correctly received by the first node.

Optionally, in the embodiment, the decoding may be performed in multiple manners to generate a plurality of pieces of bit information corresponding to data information. For example, the bit information is CRC check bits generated in the decoding process. Specifically, the CRC check bits include: the CRC check bits generated by all bits in the successfully decoded data information, or the CRC check bits generated by part bit information in the successfully decoded data information.

Optionally, the CRC check bits generated by part bit information in successfully decoded data information are bits whose correlation between different users is lower than a preset threshold. The preset threshold may be set to be 0, 10%, 20%, etc.

Optionally, the bit information may, but is not limited to, be identification information corresponding to the decoded data information, or all successfully decoded data information or part successfully decoded data information.

Optionally, the bit information is formed by spread spectrum sequences adopted by the first node. When the feedback information is sent to the second node, the same spread spectrum sequences as the first node sends the data information may be adopted.

Optionally, the bit information includes at least one of: identification information, information related to the identification information, the data information, and derivation information related to the data information.

Optionally, the first node forms feedback information for each of the plurality of second nodes into a media access control (MAC) control element (CE), or forms the feedback information for the plurality of second nodes into a protocol data unit (PDU). When there are a plurality of user equipment (UEs), that is, there are a plurality of second nodes, the sending the feedback information to the plurality of second nodes includes: putting the plurality of pieces of bit information into one MAC PDU and sending the plurality of pieces of bit information to the plurality of UEs. Specifically, each of the plurality of pieces of bit information constitutes one MAC CE, or the plurality of pieces of bit information constitutes one PDU.

The embodiment further provides a feedback information receiving method. FIG. 2 is a flowchart of a feedback information receiving method according to the embodiment of the present disclosure. As shown in FIG. 2, the method is applied to a receiving side of the MAC PDU and includes the steps described below.

In step S202, transmission blocks from a plurality of second nodes are sent to a first node.

In step S204, an MAC PDU sent from the first mode is received, where the MAC PDU is obtained through multiplexing feedback information for the plurality of second nodes in one MAC PDU by the first node, the feedback information is information generated after the first node correctly receives the transmission blocks, and the feedback information includes a plurality of pieces of bit information.

Optionally, the bit information includes at least one of: identification information, information related to the identification information, data information, and derivation information related to the data information.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the solution provided by the present disclosure substantially, or the part contributing to the related art, may be embodied in the form of a software product. The computer software product is stored in a storage medium (such as a read-only memory (ROM)/a random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 2

The embodiment further provides a feedback information processing device and system, a base station and a terminal. The device is used for implementing the above-mentioned embodiments and preferred embodiments. What has been described will not be repeated. As used below, the term "module" may be software, hardware or a combination thereof capable of implementing predetermined functions. The apparatuses in the embodiments described below are preferably implemented by software, but implementation by hardware or by a combination of software and hardware is also possible and conceived.

FIG. 3 is a block diagram of a feedback information processing device according to an embodiment of the present disclosure. As shown in FIG. 3, the device includes a multiplexing module 30 described below.

The multiplexing module 30 is configured to multiplex feedback information for a plurality of second nodes in a MAC PDU, where the feedback information is information generated after the first node correctly receives transmission blocks from the plurality of second nodes, and the feedback includes a plurality of pieces of bit information.

Optionally, in the embodiment, the decoding may be performed in multiple manners to generate a plurality of pieces of bit information corresponding to data information. For example, the bit information is CRC check bits generated in the decoding process. Specifically, the CRC check bits include: CRC check bits generated by all bits in the successfully decoded data information, or CRC check bits generated by part bit information in the successfully decoded data information.

Optionally, the CRC check bits generated by part bit information in successfully decoded data are bits whose correlation between different users is lower than a preset threshold. The preset threshold may be set to be 0, 10%, 20%, etc.

Optionally, the bit information may, but is not limited to, be identification information corresponding to the decoded data information, or all successfully decoded data information or part successfully decoded data information.

Optionally, the bit information is formed by spread spectrum sequences adopted by the first node. When the feedback information is sent to the second node, the same spread spectrum sequences as the second node sends the data information may be adopted.

Optionally, the device further includes: a delivering module, which is configured to, after the multiplexing module multiplexes the feedback information for the plurality of second nodes in the MAC PDU, use an RNTI in a process that the feedback information is delivered to the plurality of second nodes, where the RNTI is calculated according to a time domain location of a PUSCH where the transmission blocks correctly received by the first node are located.

Figure 4:
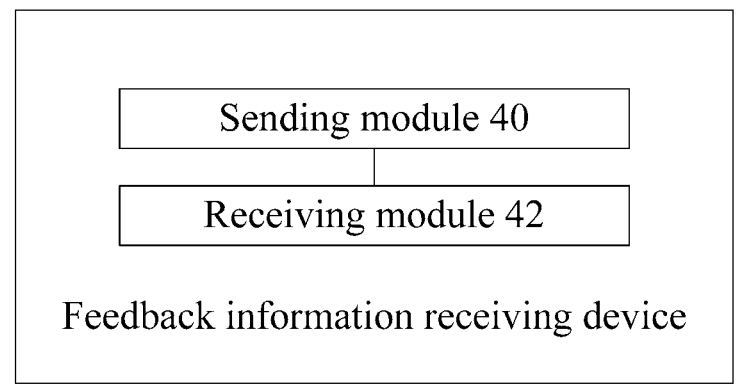
FIG. 4 is a block diagram of a feedback information receiving device according to an embodiment of the present disclosure.

The embodiment further provides a feedback information receiving device. The device may be disposed in a receiving side device of a MAC PDU. The receiving side device may be a second node or a management device of a second node. FIG. 4 is a block diagram of a feedback information receiving device according to an embodiment of the present disclosure. As shown in FIG. 4, the device includes a sending module 40 and a receiving module 42 described below. The sending module 40 is configured to send transmission blocks from a plurality of second nodes to a first node.

The receiving module 42 is configured to receive an MAC PDU sent from the first mode, where the MAC PDU is obtained through multiplexing feedback information for the plurality of second nodes in one MAC PDU by the first node, the feedback information is information generated after the first node correctly receives the transmission blocks, and the feedback information includes a plurality of pieces of bit information.

Optionally, the bit information includes at least one of: identification information, information related to the identification information, data information, and information related to the data information.

Figure 5:
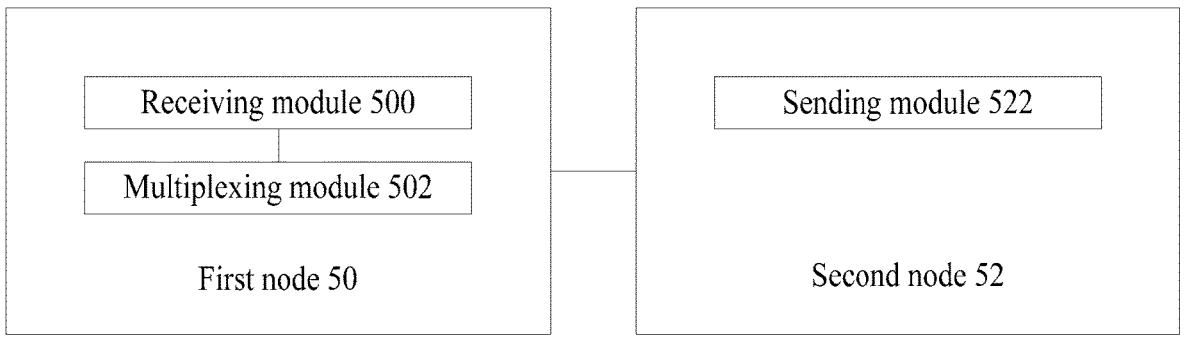
FIG. 5 is a block diagram of a feedback information processing system according to an embodiment of the present disclosure.

FIG. 5 is a block diagram of a feedback information processing system according to an embodiment of the present disclosure. As shown in FIG. 5, the system includes a first node 50 and a plurality of second nodes 52. The first node 50 includes: a receiving module 500, which is configured to receive transmission blocks sent from the second node, and a multiplexing module 502, which is configured to multiplex feedback information for a plurality of second nodes in an MAC PDU, where the feedback information is information generated after the first node correctly receives the transmission blocks from the second node, and the feedback includes a plurality of pieces of bit information. The second node 52 includes a sending module 522 which is configured to send the transmission blocks to the first node.

Optionally, the bit information includes at least one of: identification information corresponding to the transmission blocks, and all data information or part data information in the correctly received transmission block.

Optionally, the first node further includes: a delivering module, which is configured to, after the multiplexing module multiplexes the feedback information for the plurality of second nodes in the MAC PDU, use an RNTI in a process that the feedback information is delivered to the plurality of second nodes, where the RNTI is calculated according to a time domain location of a PUSCH where the transmission blocks correctly received by the first node are located.

Figure 6:
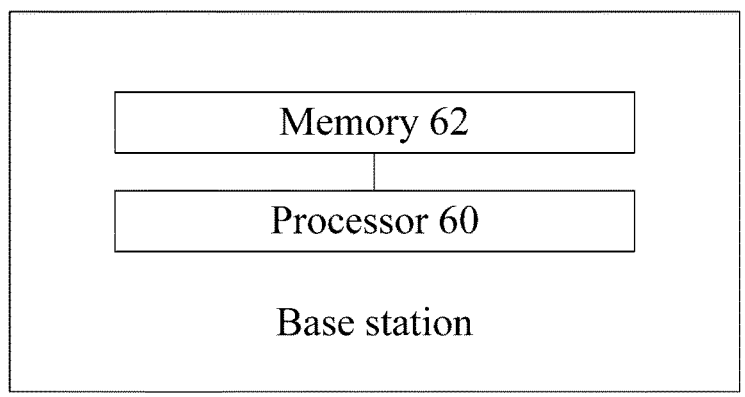
FIG. 6 is a block diagram of a base station according to an embodiment of the present disclosure.

FIG. 6 is a block diagram of a base station according to an embodiment of the present disclosure. As shown in FIG. 6, the base station includes:

a processor 60 and a memory 62 storing processor-executable instructions. When the instructions are executed by the processor, the processor executes a following operation: multiplexing feedback information for a plurality of terminals in an MAC PDU, where the feedback information is information generated after the base station correctly receives transmission blocks from the terminal, and the feedback includes a plurality of pieces of bit information.

Optionally, the bit information includes at least one of: identification information corresponding to the transmission blocks, and all data information or part data information in the correctly received transmission block.

Optionally, after the feedback information for the plurality of terminals is multiplexed in the MAC PDU, the processor further executes a following operation: using an RNTI in a process that the feedback information is delivered to the plurality of terminals, where the RNTI is calculated according to the time domain location of the PUSCH where the transmission blocks correctly received by the base station are located.

Figure 7:
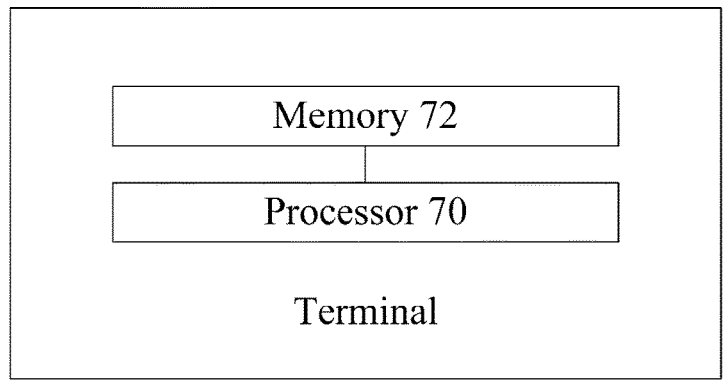
FIG. 7 is a block diagram of a terminal according to an embodiment of the present disclosure.

The embodiment provides a terminal. FIG. 7 is a block diagram of a terminal according to an embodiment of the present disclosure. As shown in FIG. 7, the terminal includes: a processor 70 and a memory 72 storing processor-executable instructions. When the instructions are executed by the processor, the processor executes a following operation: multiplexing feedback information for a plurality of base stations in an MAC PDU, where the feedback information is information generated after the terminal correctly receives transmission blocks from the base station, and the feedback includes a plurality of pieces of bit information.

Optionally, the bit information includes at least one of: identification information corresponding to the transmission blocks, and all data information or part data information in the correctly received transmission block.

Optionally, after the feedback information for the plurality of base stations is multiplexed in the MAC PDU, the processor further executes a following operation: using an RNTI in a process that the feedback information is delivered to the plurality of base stations, where the RNTI is calculated according to a time domain location of a PUSCH where the transmission blocks correctly received by the terminal are located.

Optionally, the bit information includes: CRC check bits generated by the transmission blocks correctly received by the terminal.

Optionally, the CRC check bits include: the CRC check bits generated by all bits in the transmission blocks correctly received by the terminal, or the CRC check bits generated by part bits in the transmission blocks correctly received by the terminal.

In the embodiment described above, two scenarios are specifically described, where one scenario is that the first node is the base station and the second node is the terminal, and the other scenario is that the first node is the terminal and the second node is the base station. Without any collision, there are other application scenarios where both the first node and the second node are base stations, or both the first node and the second node are terminals.

It is to be noted that the preceding modules may be implemented by software or hardware. Implementation by hardware may, but may not necessarily, be performed in the following manner: the preceding modules are located in a same processor, or the preceding modules are located in any combination in different processors.

Embodiment 3

The embodiment provides a feedback information processing method. As an optional embodiment, the embodiment is used for describing the present application in detail. The embodiment includes a plurality of specific embodiments.

Specific Embodiment 1

Figures 8, 9:
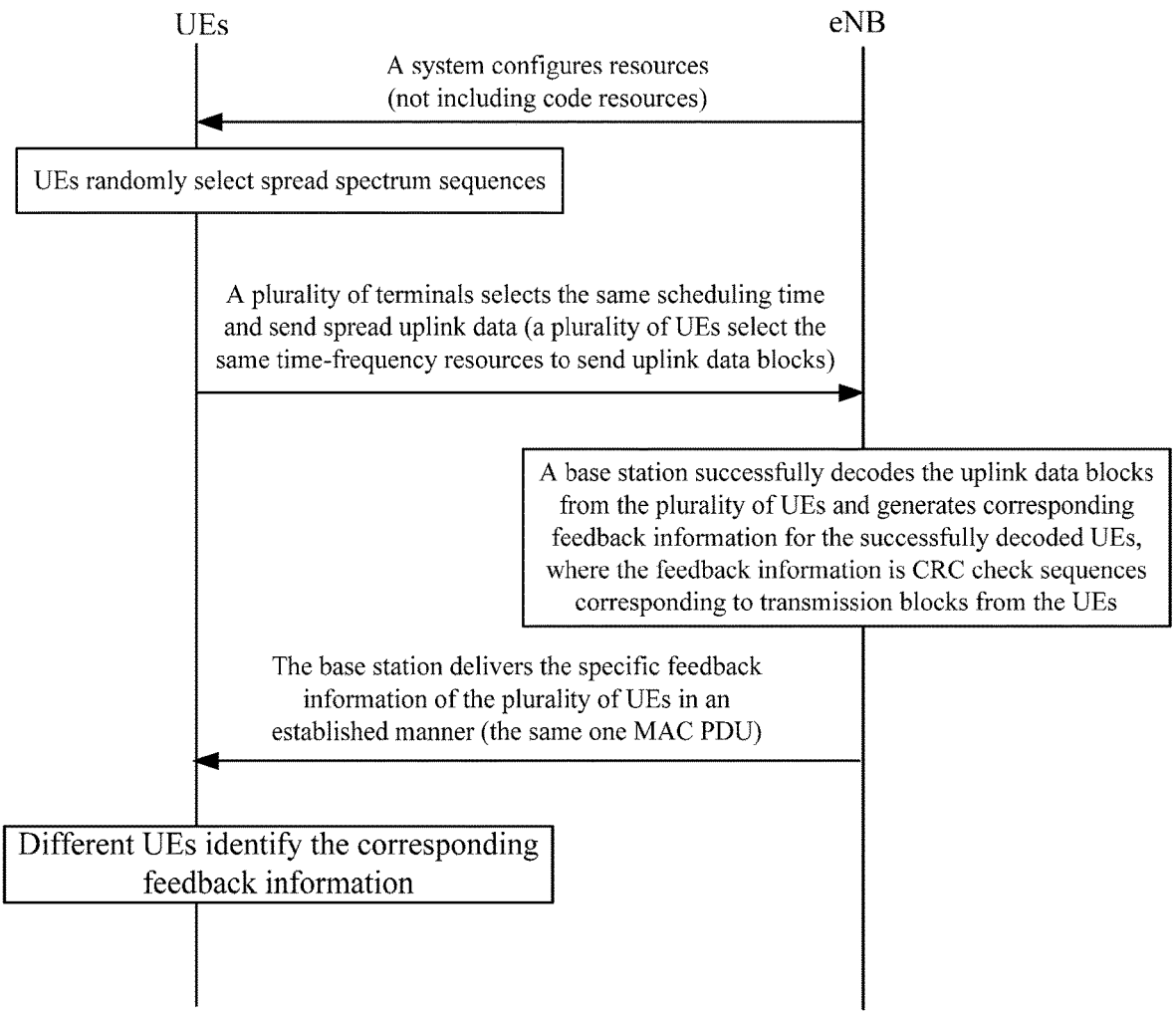
FIG. 8 is a flowchart 1 of a feedback information processing method according to an embodiment of the present disclosure.
FIG. 9 is a schematic diagram illustrating a format of feedback information of N users according to an embodiment of the present disclosure.

FIG. 8 is a flowchart 1 of a feedback information processing method according to an embodiment of the present disclosure. The method includes steps described below.

In step 1, a plurality of terminals (UEs) select the same scheduling time (a transmission time interval, TTI) to send an uplink transmission block (a physical uplink shared channel, PUSCH), and the plurality of UEs randomly select resources to send the PUSCH. The resources randomly selected by the terminal include time-frequency resources and spread spectrum sequences (code resources).

Specifically, since the resources are randomly selected by the terminal, the situation where the plurality of terminals selects the same time-frequency resources and even selects the same spread spectrum sequences is inevitable.

For example, in the embodiment, one scheduling time (an TTI) corresponds to merely one time-frequency resource, and the plurality of terminals select one time-frequency resource at the current scheduling time. For the situation of one scheduling time and a plurality of time-frequency resources, the generation manner of the feedback information may also adopt the implementation manner in the embodiment, which is not described herein. In the embodiment, the spread spectrum sequences randomly selected by the plurality of UEs are conflicting (two or more users select the same spread spectrum sequences).

In step 2, a base station (an eNB) correctly receives transmission blocks (PUSCHs) from a plurality of terminals and determines which terminals which the corresponding feedback information is generated for.

Specifically, the base station receives uplink transmission blocks (PUSCHs) from the plurality of terminals in the same TTI. The base station can determine that a terminal sends a PUSCH in the current TTI merely after correctly receiving an uplink transmission block sent from the terminal. For the transmission blocks which are not correctly received, the base station cannot determine which terminals send PUSCHs. In summary, the base station generates the corresponding feedback information for a correctly received terminal (the base station correctly parses the transmission blocks sent from the terminal).

In step 3, the base station generates the corresponding feedback information according to the correctly received transmission blocks from the terminals, where the feedback includes a plurality of pieces of bit information.

Specifically, the base station needs to perform a CRC check after receiving the transmission blocks from the terminals in the current TTI. The pass of the CRC check means that the base station correctly receives the transmission blocks. After the CRC check is passed, a base station side stores CRC check sequences corresponding to the transmission block. The feedback information is the CRC check sequences stored on the base station side. Since transmission blocks from different terminals are different, the generated CRC check sequences are also different. The base station and the terminal have already unified the generation manner of the feedback information.

For example, an MAC layer of the terminal generates the transmission block (bits contained in the transmission block are: UE ID (40 bits)+effective service bits (such as 0101010101010101)) and submits the transmission block to a physical layer. The physical layer receives the transmission block and adds CRC check bits into it. At this time, the bits contained in the transmission block are UE ID+effective service bits (0101010101010101)+CRC check bits. A processing procedure after the CRC check bits are added will not described in the embodiment. After the base station receives the transmission block (UE ID+effective service bits (0101010101010101)+CRC check bits), the CRC check is performed. The pass of the CRC check means that the base station correctly received the transmission block transmitted by the terminal.

The feedback information generated by the base station side is the CRC check bits generated by the transmission block (UE ID (40 bits)+effective service bits (such as 0101010101010101)). In step 4, the base station delivers the feedback information to the correctly received transmission blocks from the plurality of terminals in a preset feedback manner.

Figure 10:
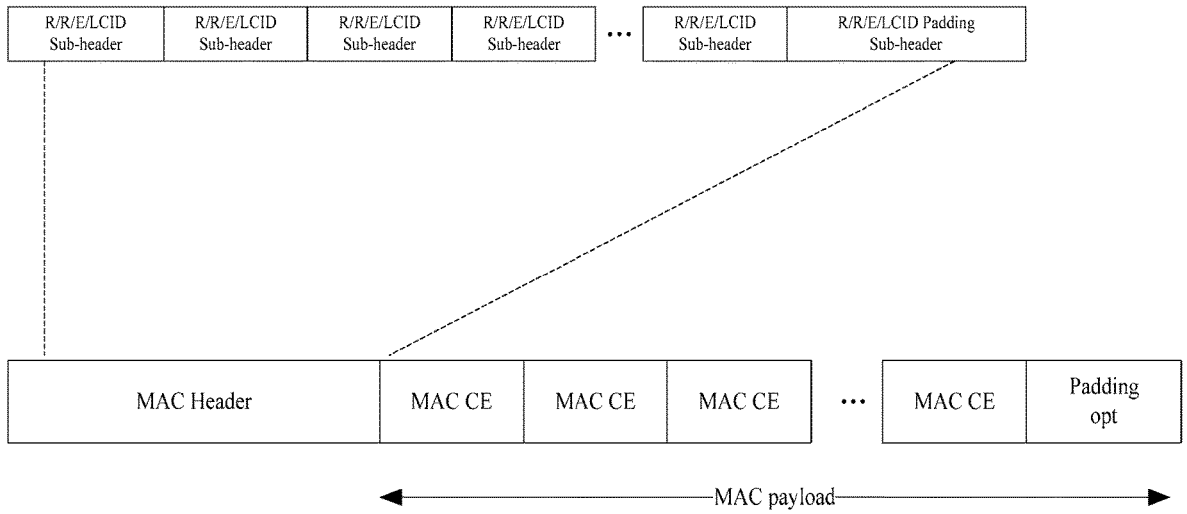
FIG. 10 is a schematic diagram 1 of a feedback information MAC PDU according to an embodiment of the present disclosure.
Figure 11:
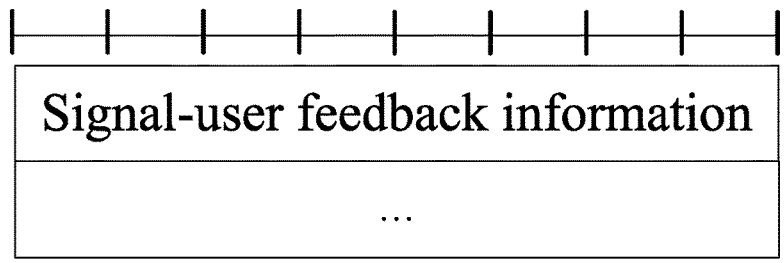
FIG. 11 is a schematic diagram of a protocol data unit formed by signal-user feedback information according to an embodiment of the present disclosure.
Figure 12:
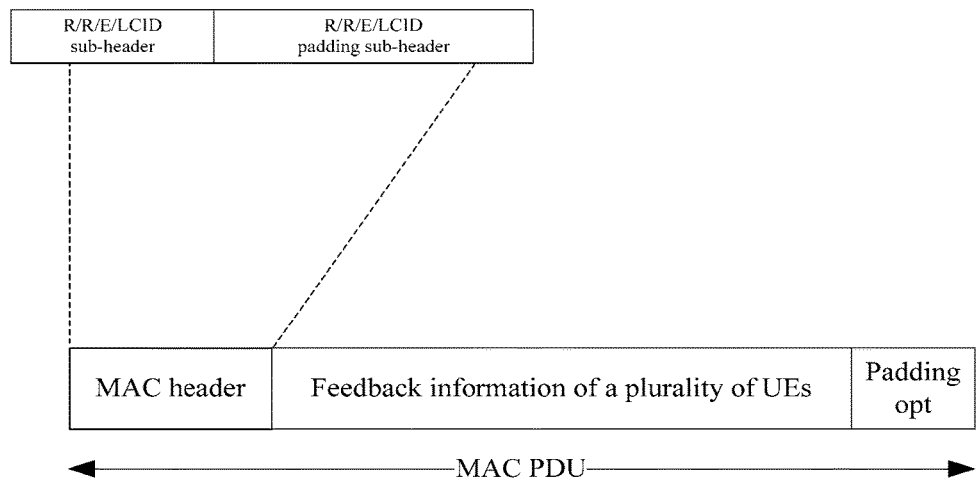
FIG. 12 is a schematic diagram 2 of a feedback information MAC PDU according to an embodiment of the present disclosure.
Figure 13:
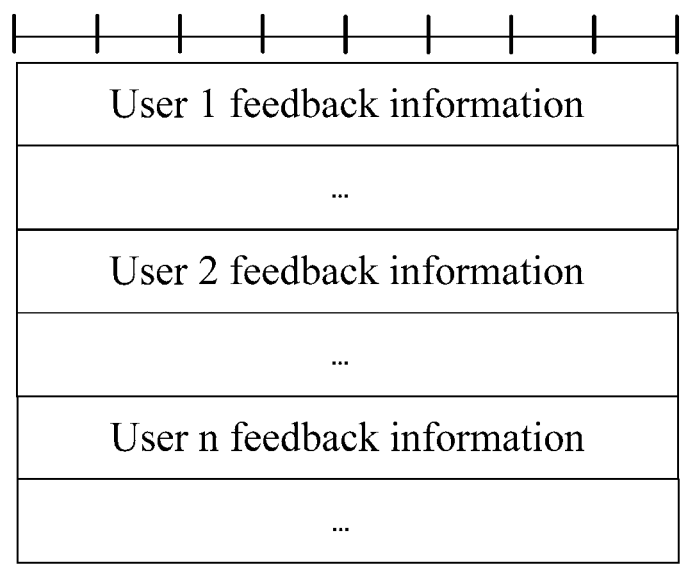
FIG. 13 is a schematic diagram of a PDU formed by multi-user feedback information according to an embodiment of the present disclosure.

The feedback manner is that a base station MAC entity delivers the feedback information of a plurality of users through one MAC PDU. FIG. 9 is a schematic diagram of a format of feedback information of N users according to an embodiment of the present disclosure. The format is a logic arrangement format of the feedback information. FIG. 10 is a schematic diagram 1 of a feedback information MAC PDU according to an embodiment of the present disclosure. FIG. 11 is a schematic diagram of a protocol data unit formed by signal-user feedback information according to an embodiment of the present disclosure. FIG. 12 is a schematic diagram 2 of a feedback information MAC PDU according to an embodiment of the present disclosure. FIG. 13 is a schematic diagram of a PDU formed by multi-user feedback information according to an embodiment of the present disclosure. The related description is shown in FIGS. 9, 10, 11, 12 and 13.

In FIG. 10, a MAC header is formed by one or more MAC subheaders. Each subheader corresponds to a MAC PDU, a MAC CE or a padding. The subheader is composed of 4 domains: R/R/E/LCID, where the LCID is short for a logical channel ID and is used for indicating a type of the corresponding PUD or MAC CE, or the corresponding padding, the R is reserved bits set to be 0, and the E is extended bits for indicating whether a subheader exists after the subheader. The feedback information of each user may individually constitute a MAC CE, and different MAC CEs are arranged in a cascaded manner.

In another example, the feedback information of the plurality of users constitutes a PDU, each user occupies a corresponding number of bytes, and the feedback information of different users adopts the cascaded manner.

Specifically, the base station side calculates a corresponding RNTI according to a time domain location of a PUSCH where the correctly received uplink transmission block (a PUSCH) from the terminal is located. A physical downlink control channel (PDCCH) scrambled by the RNTI calculated by the base station side indicates that a downlink transmission block (a PDSCH) where the feedback information is located is carried.

In step 5, the terminal decodes the PDCCH and decodes the corresponding PDSCH according to the decoded PDCCH. The terminal decodes the PDSCH, submits the PDSCH to the MAC layer, and confirms whether the feedback information of the terminal exists in the MAC CE or the MAC PDU. The terminal confirms the existence of the feedback information of the terminal, and the procedure is stopped; otherwise, go back to the step 1.

Through the procedure described above, different UEs may identify the corresponding feedback information, effectively avoiding the problems of the conflict of the feedback information and a large amount of feedback information.

Specific Embodiment 2

Figure 14:
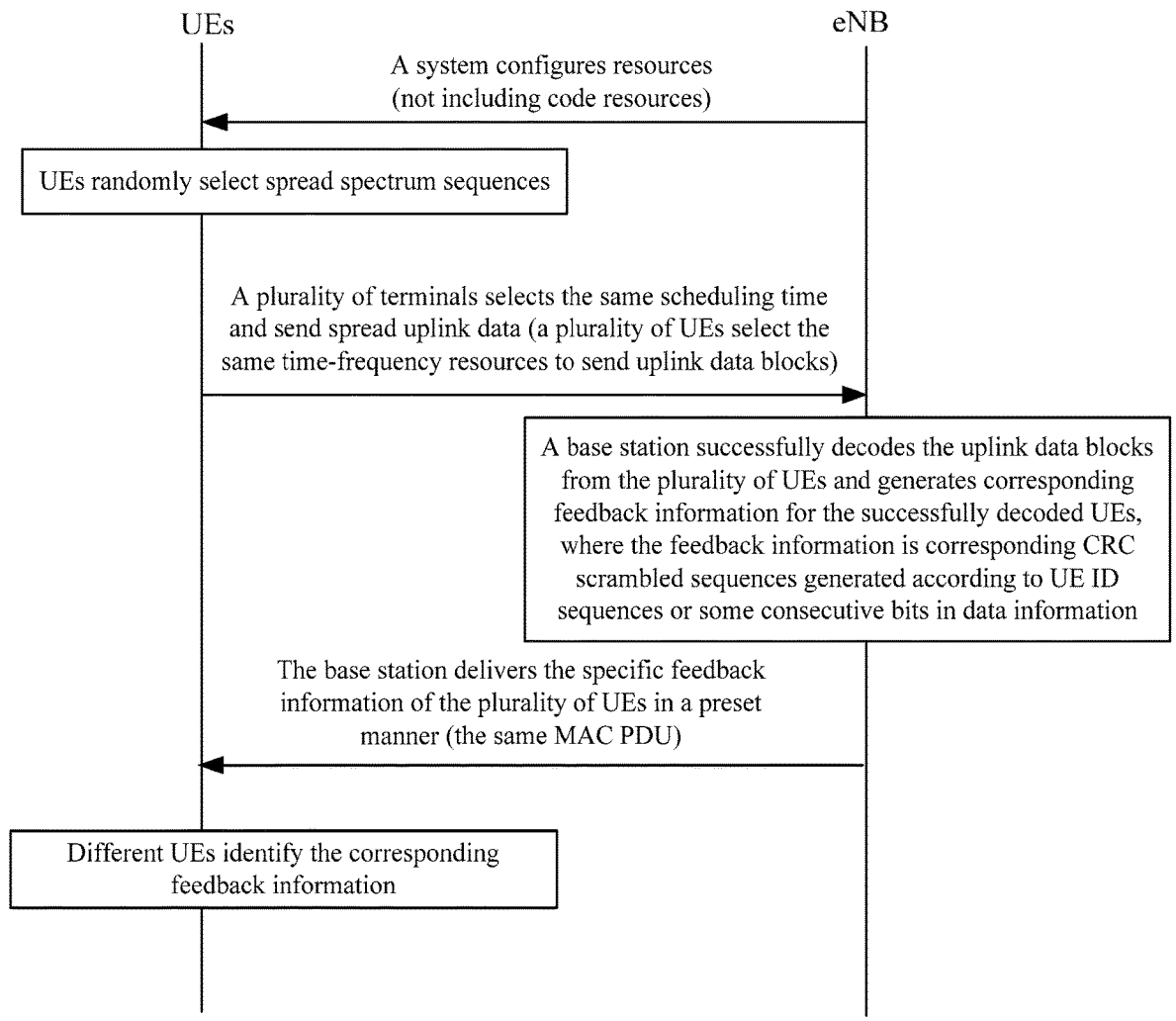
FIG. 14 is a flowchart 2 of a feedback information processing method according to an embodiment of the present disclosure.

FIG. 14 is a flowchart 2 of a feedback information processing method according to an embodiment of the present disclosure. The method includes steps described below.

In step 1, a plurality of terminals (UEs) select the same scheduling time (a transmission time interval, TTI) to send an uplink transmission block (a PUSCH), and the plurality of UEs randomly select resources to send the PUSCH. The resources randomly selected by the terminal include time-frequency resources and spread spectrum sequences.

Specifically, since the resources are randomly selected by the terminal, the situation where the plurality of terminals selects the same time-frequency resources and even selects the same spread spectrum sequences is inevitable.

For example, in the embodiment, since one scheduling time corresponds to merely one time-frequency resource, the plurality of terminals select one time-frequency resource at the current scheduling time. For the situation of one scheduling time and a plurality of time-frequency resources, the generation manner of the feedback information may also adopt the implementation manner in the embodiment, which is not described herein. In the embodiment, the spread spectrum sequences randomly selected by the plurality of UEs are conflicting (two or more users select the same spread spectrum sequences).

In step 2, a base station correctly receives transmission blocks (PUSCHs) from the plurality of terminals and determines which terminals which the corresponding feedback information is generated for.

Specifically, the base station receives uplink transmission blocks (PUSCHs) from the plurality of terminals in the same TTI. The base station can determine that a terminal sends a PUSCH in the current TTI merely after correctly receiving an uplink transmission block sent from the terminal. For the transmission blocks which are not correctly received, the base station cannot determine which terminals send PUSCHs. In summary, the base station generates the corresponding feedback information for a correctly received terminal (the base station correctly parses the transmission blocks sent from the terminal).

In step 3, the base station generates the corresponding feedback information according to the correctly received transmission block of the terminal, where the feedback includes a plurality of pieces of bit information.

Specifically, the base station needs to perform a CRC check after receiving the transmission blocks from the terminals in the current TTI. The pass of the CRC check means that the base station correctly receives the transmission blocks. For the correctly received transmission block, part data information is extracted. The data information includes UE ID sequences or some consecutive bits in the data information. Corresponding CRC scrambled sequences are generated according to the UE ID sequences or some consecutive bits in the data information.

Since the UE ID is different and some consecutive bits in the data information are different, the generated CRC scrambled sequences are also different. Some consecutive bits are bit sequences whose correlation between different UEs is lower than a certain threshold. Both the UE and the base station have already determined selected data sequences. The feedback information is the generated CRC scrambled sequences. The base station and the terminal have already unified the generation manner of the feedback information.

For example, an MAC layer of the terminal generates the transmission block (bits contained in the transmission block are: UE ID (40 bits)+effective service bits (such as 0101010101010101)) and submits the transmission block to a physical layer. The physical layer receives the transmission block and adds CRC check bits into it. At this time, the bits contained in the transmission block are UE ID+effective service bits (0101010101010101)+CRC check bits. A processing procedure after the CRC check bits are added will not described in the embodiment. After the base station receives the transmission block (UE ID+effective service bits (0101010101010101)+CRC check bits), the CRC check is performed. The pass of the CRC check means that the base station correctly received the transmission block transmitted by the terminal.

The feedback information generated by the base station side is the CRC check bits generated by the UE ID (40 bits) of the transmission block.

In another example, the feedback information generated by the base station side is the CRC check bits generated by the transmission blocks (effective service bits (such as 0101010101010101)).

In step 4, the base station delivers the feedback information to the correctly received transmission blocks from the plurality of terminals in a preset feedback manner.

The feedback manner is that a base station MAC entity delivers the feedback information of a plurality of users through one MAC PDU. FIG. 9 is a schematic diagram of a format of feedback information of N users according to an embodiment of the present disclosure.

The feedback information of each user may individually constitute a MAC CE, and different MAC CEs are arranged in a cascaded manner.

In another example, the feedback information of the plurality of users constitutes a PDU, each user occupies a corresponding number of bytes, and the feedback information of different users adopts the cascaded manner.

FIG. 10 is a schematic diagram 1 of a feedback information MAC PDU according to an embodiment of the present disclosure. FIG. 11 is a schematic diagram of a protocol data unit formed by signal-user feedback information according to an embodiment of the present disclosure. FIG. 12 is a schematic diagram 2 of a feedback information MAC PDU according to an embodiment of the present disclosure. FIG. 13 is a schematic diagram of a PDU formed by multi-user feedback information according to an embodiment of the present disclosure. The related description is shown in FIGS. 9, 10, 11, 12 and 13.

Specifically, the base station side calculates a corresponding RNTI according to a time domain location of a PUSCH where the correctly received uplink transmission block (a PUSCH) from the terminal is located. A PDCCH scrambled by the RNTI calculated by the base station side indicates that a downlink transmission block (a PDSCH) where the feedback information is located is carried.

In step 5, the terminal decodes the PDCCH and decodes the corresponding PDSCH according to the decoded PDCCH. The terminal decodes the PDSCH, submits the PDSCH to the MAC layer, and confirms whether the feedback information of the terminal exists in the MAC CE or the MAC PDU. The terminal confirms the existence of the feedback information of the terminal, and the procedure is stopped; otherwise, go back to the step 1.

Specific Embodiment 3

Figure 15:
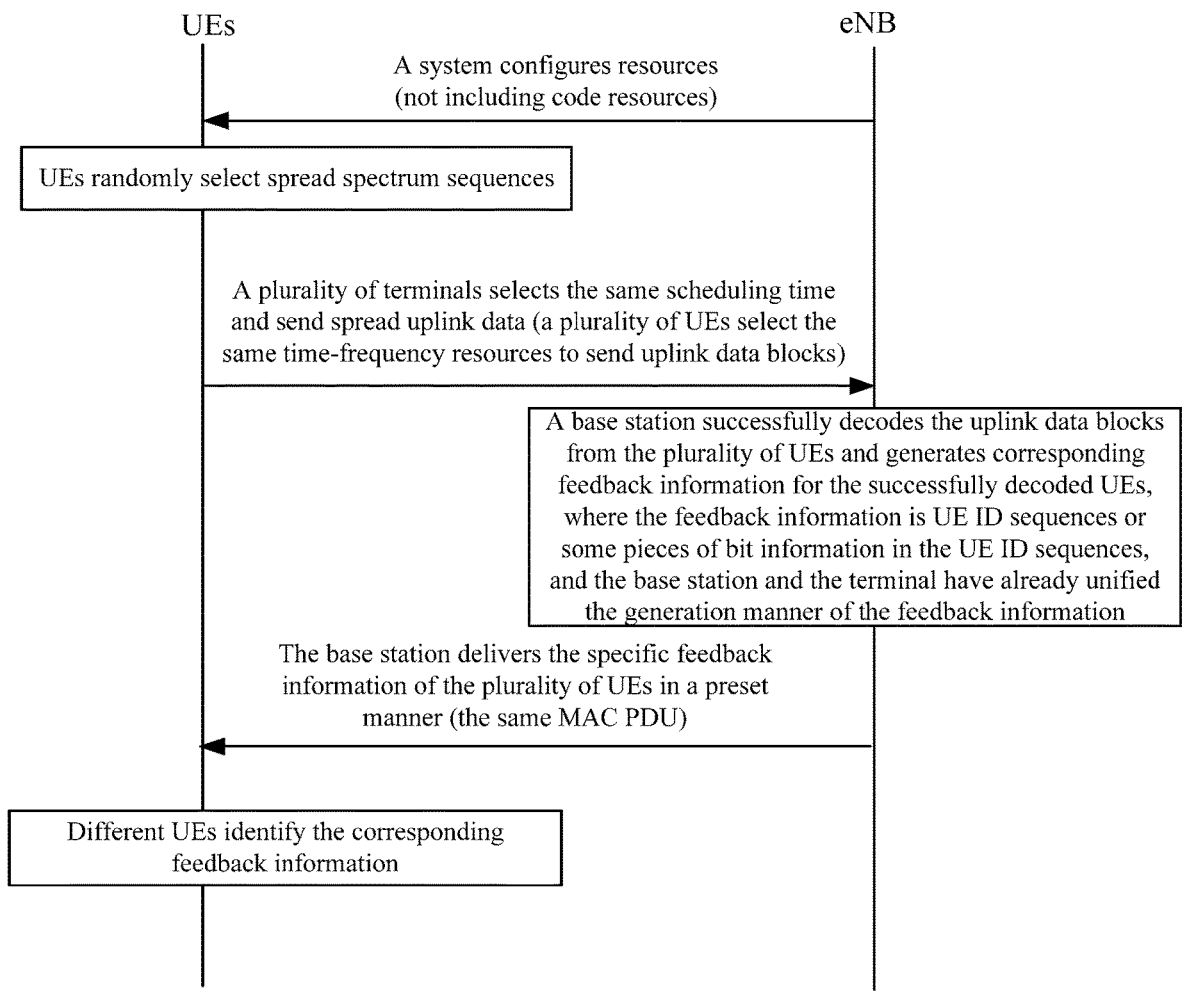
FIG. 15 is a flowchart 3 of a feedback information processing method according to an embodiment of the present disclosure.

FIG. 15 is a flowchart 3 of a feedback information processing method according to an embodiment of the present disclosure. The method includes steps described below.

In step 1, a plurality of terminals (UEs) select the same scheduling time (an TTI) to send an uplink transmission block (a PUSCH), and the plurality of UEs randomly select resources to send the PUSCH. The resources randomly selected by the terminal include time-frequency resources and spread spectrum sequences.

Specifically, since the resources are randomly selected by the terminal, the situation where the plurality of terminals selects the same time-frequency resources and even selects the same spread spectrum sequences is inevitable.

For example, in the embodiment, since one scheduling time corresponds to merely one time-frequency resource, the plurality of terminals select one time-frequency resource at the current scheduling time. For the situation of one scheduling time and a plurality of time-frequency resources, the generation manner of the feedback information may also adopt the implementation manner in the embodiment, which is not described herein. In the embodiment, the spread spectrum sequences randomly selected by the plurality of UEs are conflicting (two or more users select the same spread spectrum sequences).

In step 2, a base station correctly receives transmission blocks (PUSCHs) from the plurality of terminals and determines which terminals which the corresponding feedback information is generated for.

Specifically, the base station receives uplink transmission blocks (PUSCHs) from the plurality of terminals in the same TTI. The base station can determine that a terminal sends a PUSCH in the current TTI merely after correctly receiving an uplink transmission block sent from the terminal. For the transmission blocks which are not correctly received, the base station cannot determine which terminals send PUSCHs. In summary, the base station generates the corresponding feedback information for a correctly received terminal (the base station correctly parses the transmission blocks sent from the terminal).

In step 3, the base station generates the corresponding feedback information according to the correctly received transmission block of the terminal, where the feedback includes a plurality of pieces of bit information.

Specifically, the base station needs to perform a CRC check after receiving the transmission blocks from the terminal in the current TTI. The pass of the CRC check means that the base station correctly receives the transmission blocks. After the CRC check is passed, part data information in the transmission block is extracted to directly generate the feedback information, such as UE ID sequences or some pieces of bit information in the UE ID sequences. Bit sequences whose correlation between different UEs is low are selected, and both the UE and the base station have already determined the selected data sequences. The feedback information is the UE ID sequences or some pieces of bit information in the UE ID sequences. The base station and the terminal have already unified the generation manner of the feedback information.

For example, an MAC layer of the terminal generates the transmission block (bits contained in the transmission block are: UE ID (40 bits)+effective service bits (such as 0101010101010101)) and submits the transmission block to a physical layer. The physical layer receives the transmission block and adds CRC check bits into it. At this time, the bits contained in the transmission block are UE ID+effective service bits (0101010101010101)+CRC check bits. A processing procedure after the CRC check bits are added will not described in the embodiment. After the base station receives the transmission block (UE ID+effective service bits (0101010101010101)+CRC check bits), the CRC check is performed. The pass of the CRC check means that the base station correctly received the transmission block transmitted by the terminal.

The feedback information generated by the base station side is the UE ID (40 bits) of the transmission block.

In another example, the feedback information generated by the base station side is last 20 bits in the UE ID (40 bits) of the transmission block.

In step 4, the base station delivers the feedback information to the correctly received transmission blocks from the plurality of terminals in a preset feedback manner.

The feedback manner is that a base station MAC entity delivers the feedback information of a plurality of users through one MAC PDU. FIG. 9 is a schematic diagram of a format of feedback information of N users according to an embodiment of the present disclosure.

The feedback information of each user may individually constitute a MAC CE, and different MAC CEs are arranged in a cascaded manner.

In another example, the feedback information of the plurality of users constitutes a PDU, each user occupies a corresponding number of bytes, and the feedback information of different users adopts the cascaded manner.

FIG. 10 is a schematic diagram 1 of a feedback information MAC PDU according to an embodiment of the present disclosure. FIG. 11 is a schematic diagram of a protocol data unit formed by signal-user feedback information according to an embodiment of the present disclosure. FIG. 12 is a schematic diagram 2 of a feedback information MAC PDU according to an embodiment of the present disclosure. FIG. 13 is a schematic diagram of a PDU formed by multi-user feedback information according to an embodiment of the present disclosure. The related description is shown in FIGS. 9, 10, 11, 12 and 13.

Specifically, the base station side calculates a corresponding RNTI according to a time domain location of a PUSCH where the correctly received uplink transmission block (a PUSCH) from the terminal is located. A PDCCH scrambled by the RNTI calculated by the base station side indicates that a downlink transmission block (a PDSCH) where the feedback information is located is carried.

In step 5, the terminal decodes the PDCCH and decodes the corresponding PDSCH according to the decoded PDCCH. The terminal decodes the PDSCH, submits the PDSCH to the MAC layer, and confirms whether the feedback information of the terminal exists in the MAC CE or the MAC PDU. The terminal confirms the existence of the feedback information of the terminal, and the procedure is stopped; otherwise, go back to the step 1.

Specific Embodiment 4

Figure 16:
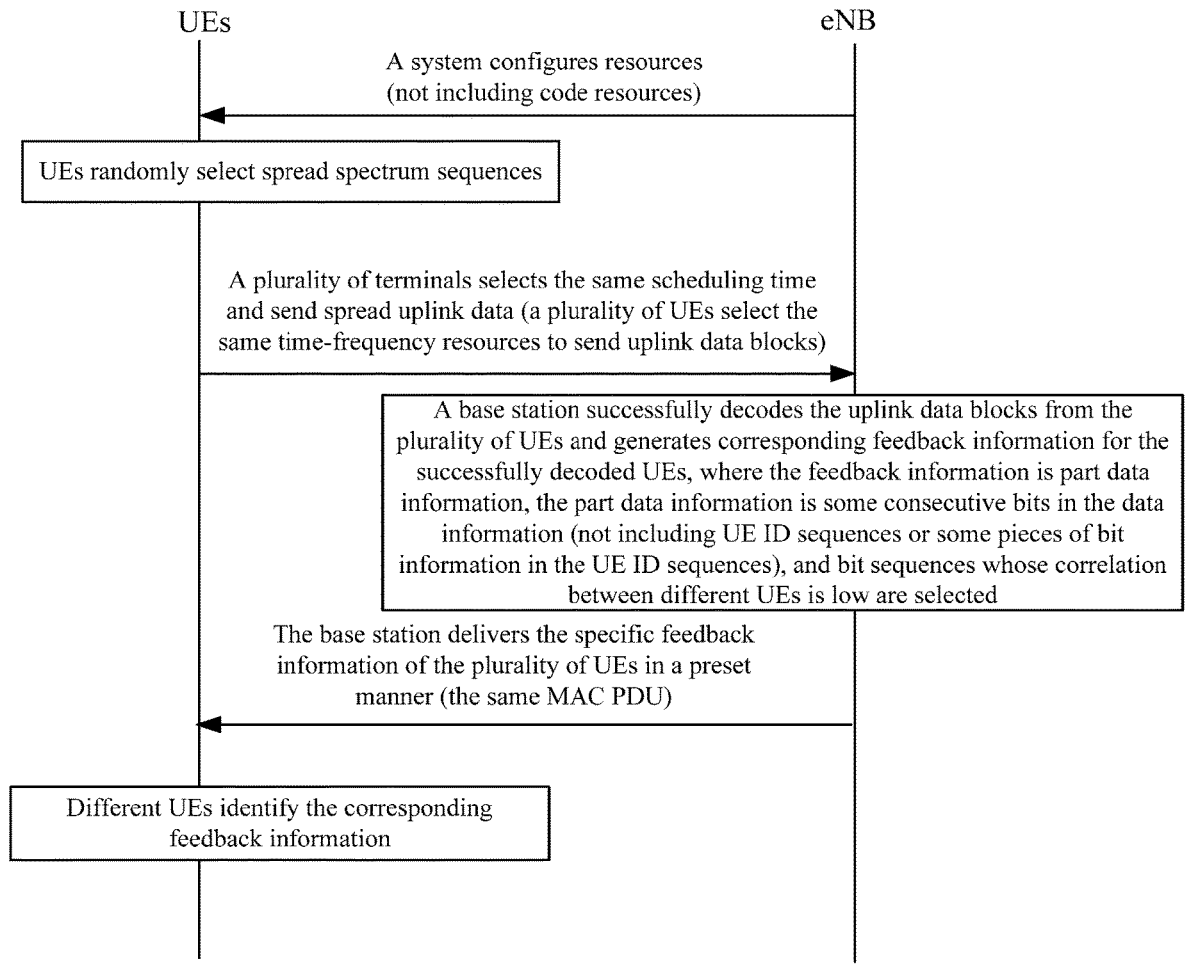
FIG. 16 is a flowchart 4 of a feedback information processing method according to an embodiment of the present disclosure.

FIG. 16 is a flowchart 4 of a feedback information processing method according to an embodiment of the present disclosure. The method includes steps described below.

In step 1, a plurality of terminals (UEs) select the same scheduling time (an TTI) to send an uplink transmission block (a PUSCH), and the plurality of UEs randomly select resources to send the PUSCH. The resources randomly selected by the terminal include time-frequency resources and spread spectrum sequences.

Specifically, since the resources are randomly selected by the terminal, the situation where the plurality of terminals selects the same time-frequency resources and even selects the same spread spectrum sequences is inevitable.

For example, in the embodiment, since one scheduling time corresponds to merely one time-frequency resource, the plurality of terminals select one time-frequency resource at the current scheduling time. For the situation of one scheduling time and a plurality of time-frequency resources, the generation manner of the feedback information may also adopt the implementation manner in the embodiment, which is not described herein. In the embodiment, the spread spectrum sequences randomly selected by the plurality of UEs are conflicting (two or more users select the same spread spectrum sequences).

In step 2, a base station correctly receives transmission blocks (PUSCHs) from the plurality of terminals and determines which terminals which the corresponding feedback information is generated for.

Specifically, the base station receives uplink transmission blocks (PUSCHs) from the plurality of terminals in the same TTI. The base station can determine that a terminal sends a PUSCH in the current TTI only after correctly receiving an uplink transmission block sent from the terminal. For the transmission blocks which are not correctly received, the base station cannot determine which terminals send PUSCHs. In summary, the base station generates the corresponding feedback information for a correctly received terminal (the base station correctly parses the transmission blocks sent from the terminal).

In step 3, the base station generates the corresponding feedback information according to the correctly received transmission block of the terminal, where the feedback includes a plurality of pieces of bit information.

Specifically, the base station needs to perform a CRC check after receiving the transmission blocks from the terminal in the current TTI. The pass of the CRC check means that the base station correctly receives the transmission blocks. After the CRC check is passed, part data information in the transmission block is extracted to generate the feedback information. The part data information is some consecutive bits (not including UE ID sequences or some pieces of bit information in the UE ID sequences). Bit sequences whose correlation between different UEs is low are selected, and both the UE and the base station have already determined the selected data sequences. The base station and the terminal have already unified the generation manner of the feedback information.

For example, an MAC layer of the terminal generates the transmission block (bits contained in the transmission block are: UE ID (40 bits)+effective service bits) and submits the transmission block to a physical layer. The physical layer receives the transmission block and adds CRC check bits into it. At this time, the bits contained in the transmission block are UE ID+effective service bits+CRC check bits. A processing procedure after the CRC check bits are added will not described in the embodiment.

After the base station receives the transmission block (UE ID+effective service bits+CRC check bits), the CRC check is performed. The pass of the CRC check means that the base station correctly received the transmission block transmitted by the terminal.

The feedback information generated by the base station side is part bits in the effective service bits of the transmission block.

In step 4, the base station delivers the feedback information to the correctly received transmission blocks from the plurality of terminals in a preset feedback manner.

The feedback manner is that a base station MAC entity delivers the feedback information of a plurality of users through one MAC PDU. FIG. 9 is a schematic diagram of a format of feedback information of N users according to an embodiment of the present disclosure.

The feedback information of each user may individually constitute a MAC CE, and different MAC CEs are arranged in a cascaded manner.

In another example, the feedback information of the plurality of users constitutes a PDU, each user occupies a corresponding number of bytes, and the feedback information of different users adopts the cascaded manner.

FIG. 10 is a schematic diagram 1 of a feedback information MAC PDU according to an embodiment of the present disclosure. FIG. 11 is a schematic diagram of a protocol data unit formed by signal-user feedback information according to an embodiment of the present disclosure. FIG. 12 is a schematic diagram 2 of a feedback information MAC PDU according to an embodiment of the present disclosure. FIG. 13 is a schematic diagram of a PDU formed by multi-user feedback information according to an embodiment of the present disclosure. The related description is shown in FIGS. 9, 10, 11, 12 and 13.

Specifically, the base station side calculates a corresponding RNTI according to a time domain location of a PUSCH where the correctly received uplink transmission block (a PUSCH) from the terminal is located. A PDCCH scrambled by the RNTI calculated by the base station side indicates that a downlink transmission block (a PDSCH) where the feedback information is located is carried.

In step 5, the terminal decodes the PDCCH and decodes the corresponding PDSCH according to the decoded PDCCH. The terminal decodes the PDSCH, submits the PDSCH to the MAC layer, and confirms whether the feedback information of the terminal exists in the MAC CE or the MAC PDU. The terminal confirms the existence of the feedback information of the terminal, and the procedure is stopped; otherwise, go back to the step 1.

Specific Embodiment 5

Figure 17:
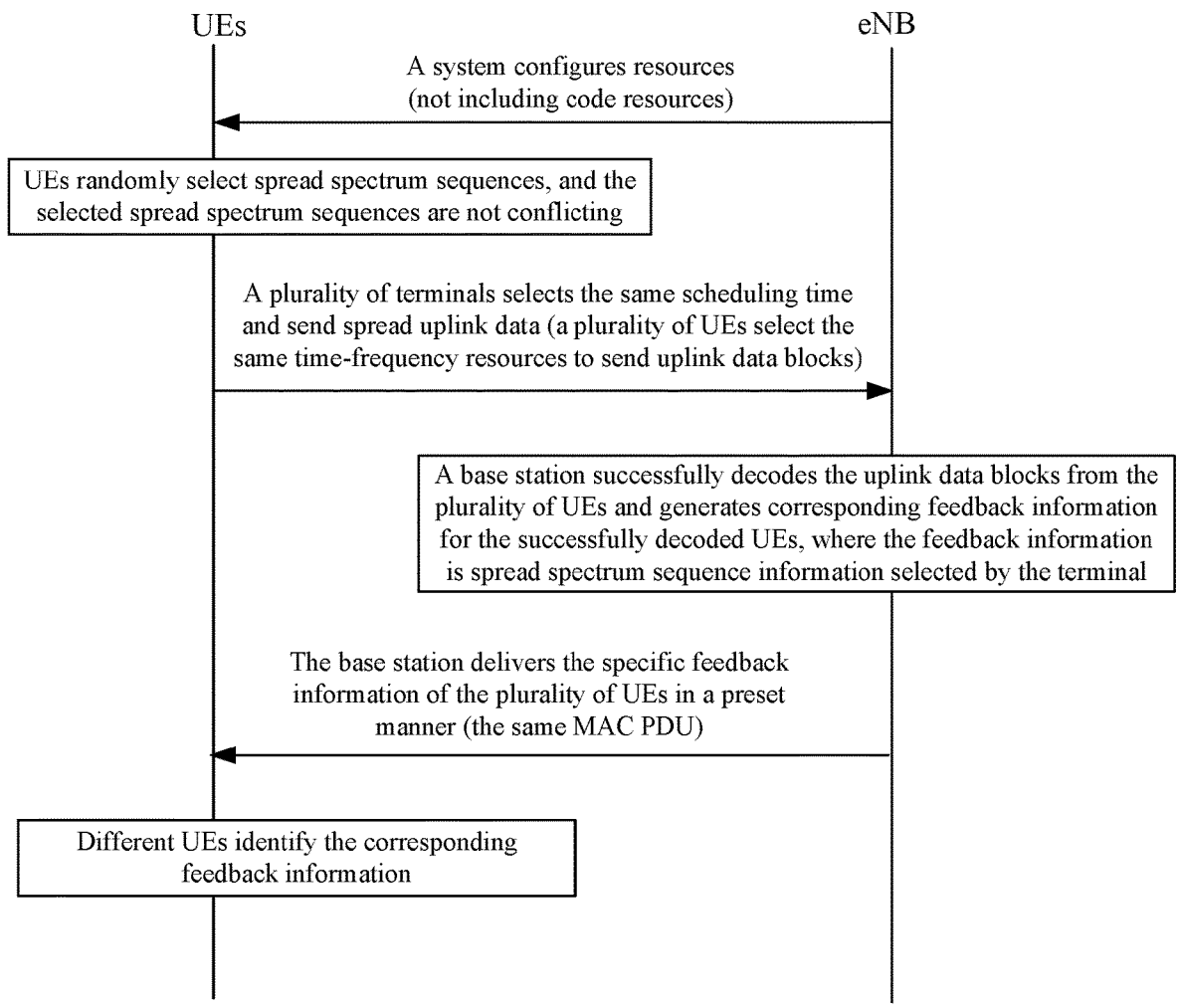
FIG. 17 is a flowchart 5 of a feedback information processing method according to an embodiment of the present disclosure.

FIG. 17 is a flowchart 5 of a feedback information processing method according to an embodiment of the present disclosure. The method includes steps described below.

In step 1, a plurality of terminals (UEs) select the same scheduling time (an TTI) to send an uplink transmission block (a PUSCH), and the plurality of UEs randomly select resources to send the PUSCH. The resources randomly selected by the terminal include time-frequency resources and spread spectrum sequences.

Specifically, since the resources are randomly selected by the terminal, the situation where the plurality of terminals selects the same time-frequency resources and even selects the same spread spectrum sequences is inevitable.

For example, in the embodiment, since one scheduling time corresponds to merely one time-frequency resource, the plurality of terminals select one time-frequency resource at the current scheduling time. For the situation of one scheduling time and a plurality of time-frequency resources, the generation manner of the feedback information may also adopt the implementation manner in the embodiment, which is not described herein. In the embodiment, the spread spectrum sequences randomly selected by all UEs are not conflicting (two or more users select different spread spectrum sequences), and different UEs select the same time-frequency domain resources.

In step 2, a base station correctly receives transmission blocks (PUSCHs) from the plurality of terminals and determines which terminals which the corresponding feedback information is generated for.

Specifically, the base station receives uplink transmission blocks (PUSCHs) from the plurality of terminals in the same TTI. The base station can determine that a terminal sends a PUSCH in the current TTI merely after correctly receiving an uplink transmission block sent from the terminal. For the transmission blocks which are not correctly received, the base station cannot determine which terminals send PUSCHs. In summary, the base station generates the corresponding feedback information for a correctly received terminal (the base station correctly parses the transmission blocks sent from the terminal).

In step 3, the base station generates the corresponding feedback information according to the correctly received transmission block from the terminal, where the feedback includes a plurality of pieces of bit information.

Specifically, the base station needs to perform a CRC check after receiving the transmission blocks from the terminal in the current TTI. The pass of the CRC check means that the base station correctly receives the transmission blocks. After the CRC check is passed, a base station side stores CRC check sequences corresponding to the transmission blocks. The feedback information is selected spread spectrum sequence information. The base station and the terminal have already unified the generation manner of the feedback information.

In step 4, the base station delivers the feedback information to the correctly received transmission blocks from the plurality of terminals in a presets feedback manner.

The feedback manner is that a base station MAC entity delivers the feedback information of a plurality of users through one MAC PDU. FIG. 9 is a schematic diagram of a format of feedback information of N users according to an embodiment of the present disclosure.

The feedback information of each user may individually constitute a MAC CE, and different MAC CEs are arranged in a cascaded manner.

In another example, the feedback information of the plurality of users constitutes a PDU, each user occupies a corresponding number of bytes, and the feedback information of different users adopts the cascaded manner.

FIG. 10 is a schematic diagram 1 of a feedback information MAC PDU according to an embodiment of the present disclosure. FIG. 11 is a schematic diagram of a protocol data unit formed by signal-user feedback information according to an embodiment of the present disclosure. FIG. 12 is a schematic diagram 2 of a feedback information MAC PDU according to an embodiment of the present disclosure. FIG. 13 is a schematic diagram of a PDU formed by multi-user feedback information according to an embodiment of the present disclosure. The related description is shown in FIGS. 9, 10, 11, 12 and 13.

Specifically, the base station side calculates a corresponding RNTI according to a time domain location of a PUSCH where the correctly received uplink transmission block (a PUSCH) from the terminal is located. A PDCCH scrambled by the RNTI calculated by the base station side indicates that a downlink transmission block (a PDSCH) where the feedback information are located is carried.

In step 5, the terminal decodes the PDCCH and decodes the corresponding PDSCH according to the decoded PDCCH. The terminal decodes the PDSCH, submits the PDSCH to the MAC layer, and confirms whether the feedback information of the terminal exists in the MAC CE or the MAC PDU. The terminal confirms the existence of the feedback information of the terminal, and the procedure is stopped; otherwise, go back to the step 1.

Specific Embodiment 6

Figure 18:
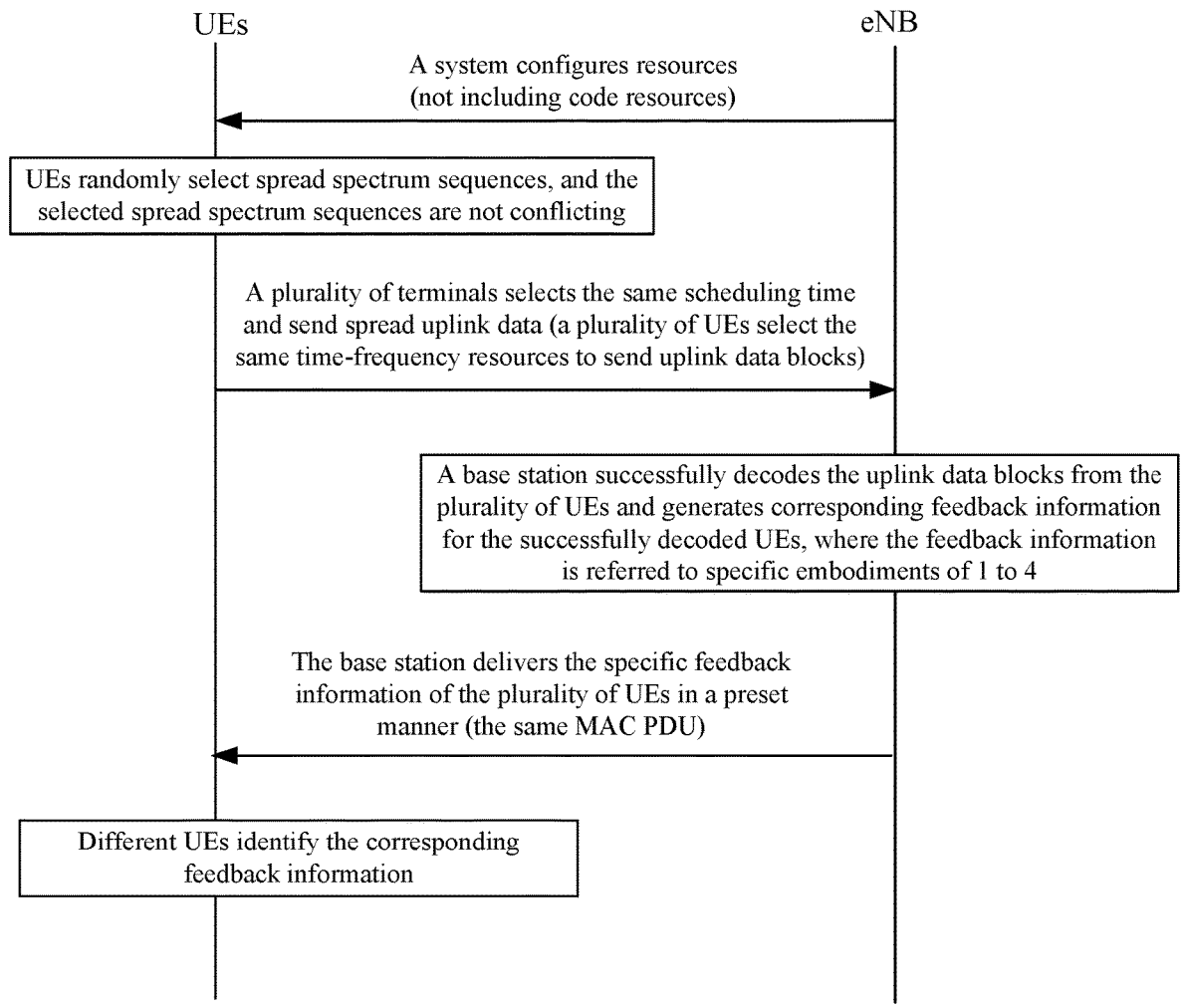
FIG. 18 is a flowchart 6 of a feedback information processing method according to an embodiment of the present disclosure.

FIG. 18 is a flowchart 6 of a feedback information processing method according to an embodiment of the present disclosure. The method includes steps described below.

In step 1, a plurality of terminals (UEs) select the same scheduling time (an TTI) to send an uplink transmission block (a PUSCH), and the plurality of UEs randomly select resources to send the PUSCH. The resources randomly selected by the terminal include time-frequency resources and spread spectrum sequences.

Specifically, since the resources are randomly selected by the terminal, the situation where the plurality of terminals selects the same time-frequency resources and even selects the same spread spectrum sequences is inevitable.

For example, in the embodiment, since one scheduling time corresponds to merely one time-frequency resource, the plurality of terminals select one time-frequency resource at the current scheduling time. For the situation of one scheduling time and a plurality of time-frequency resources, the generation manner of the feedback information may also adopt the implementation manner in the embodiment, which is not described herein. In the embodiment, the spread spectrum sequences randomly selected by all UEs are not conflicting (two or more users select different spread spectrum sequences), and different UEs select the same time-frequency domain resources.

In step 2, a base station correctly receives transmission blocks (PUSCHs) from the plurality of terminals and determines which terminals which the corresponding feedback information is generated for.

Specifically, the base station receives uplink transmission blocks (PUSCHs) from the plurality of terminals in the same TTI. The base station can determine that a terminal sends a PUSCH in the current TTI only after correctly receiving an uplink transmission block sent from the terminal. For the transmission blocks which are not correctly received, the base station cannot determine which terminals send PUSCHs. In summary, the base station generates the corresponding feedback information for a correctly received terminal (the base station correctly parses the transmission blocks sent from the terminal).

In step 3, the base station generates the corresponding feedback information according to the correctly received transmission block of the terminal, where the feedback includes a plurality of pieces of bit information.

Specifically, the base station needs to perform a CRC check after receiving the transmission blocks from the terminal in the current TTI. The pass of the CRC check means that the base station correctly receives the transmission blocks. After the CRC check is passed, a base station side stores CRC check sequences corresponding to the transmission blocks. The content of the feedback information may be referred to the generation manners of the specific embodiments 1 to 4. The base station and the terminal have already unified the generation manner of the feedback information.

In step 4, the base station delivers the feedback information to the correctly received transmission blocks from the plurality of terminals in an established feedback manner.

The feedback manner is that a base station MAC entity delivers the feedback information of a plurality of users through one MAC PDU. FIG. 9 is a schematic diagram of a format of feedback information of N users according to an embodiment of the present disclosure.

The feedback information of each user may individually constitute a MAC CE, and different MAC CEs are arranged in a cascaded manner.

In another example, the feedback information of the plurality of users constitutes a PDU, each user occupies a corresponding number of bytes, and the feedback information of different users adopts the cascaded manner.

FIG. 10 is a schematic diagram 1 of a feedback information MAC PDU according to an embodiment of the present disclosure. FIG. 11 is a schematic diagram of a protocol data unit formed by signal-user feedback information according to an embodiment of the present disclosure. FIG. 12 is a schematic diagram 2 of a feedback information MAC PDU according to an embodiment of the present disclosure. FIG. 13 is a schematic diagram of a PDU formed by multi-user feedback information according to an embodiment of the present disclosure. The related description is shown in FIGS. 9, 10, 11, 12 and 13.

Specifically, the base station side calculates a corresponding RNTI according to a time domain location of a PUSCH where the correctly received uplink transmission block (a PUSCH) from the terminal is located. A PDCCH scrambled by the RNTI calculated by the base station side indicates that a downlink transmission block (a PDSCH) where the feedback information is located is carried.

In step 5, the terminal decodes the PDCCH and decodes the corresponding PDSCH according to the decoded PDCCH. The terminal decodes the PDSCH, submits the PDSCH to the MAC layer, and confirms whether the feedback information of the terminal exists in the MAC CE or the MAC PDU. The terminal confirms the existence of the feedback information of the terminal, and the procedure is stopped; otherwise, go back to the step 1.

Specific Embodiment 7

Figure 19:
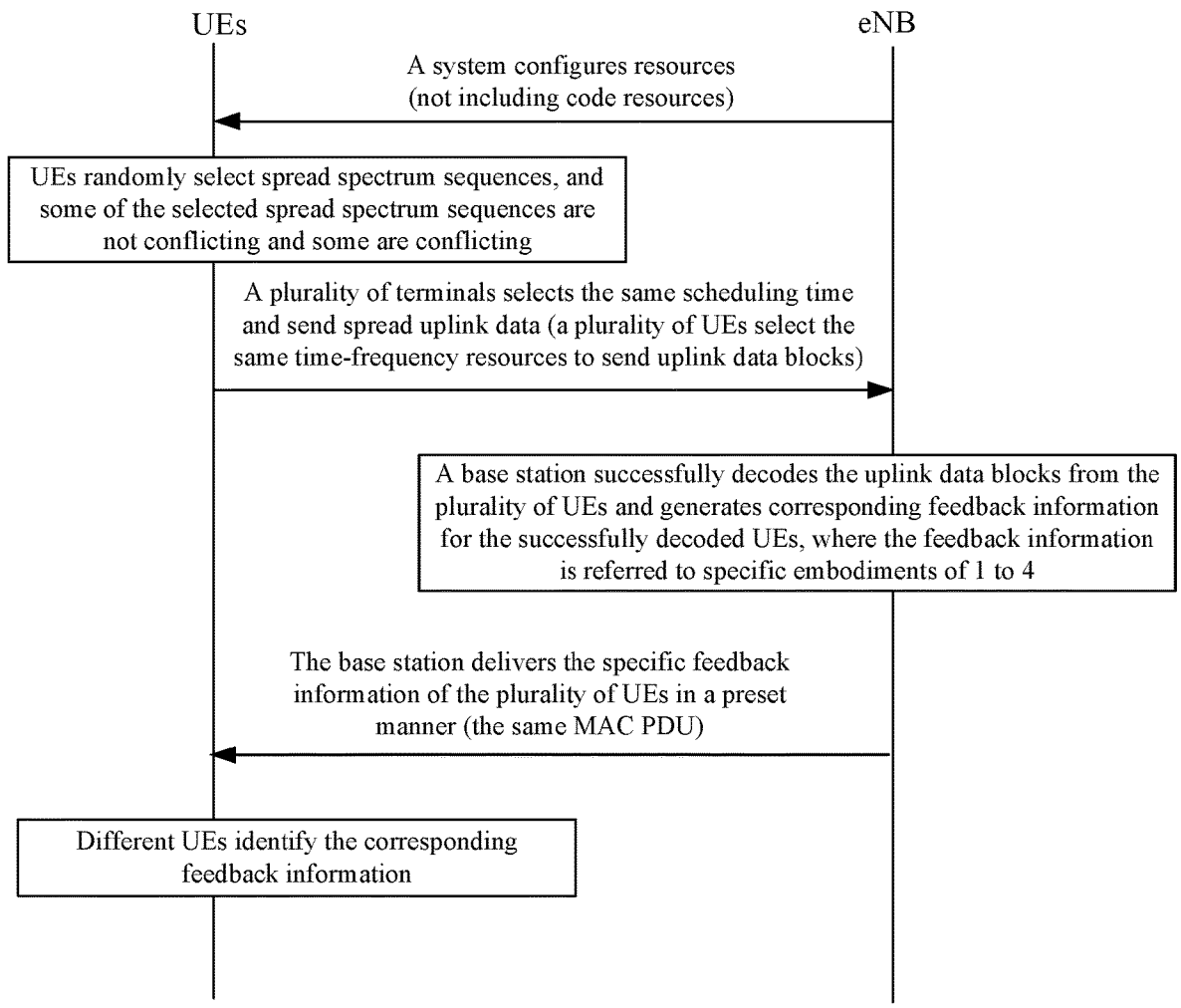
FIG. 19 is a flowchart 7 of a feedback information processing method according to an embodiment of the present disclosure.

FIG. 19 is a flowchart 7 of a feedback information processing method according to an embodiment of the present disclosure. The method includes steps described below.

In step 1, a plurality of terminals (UEs) select the same scheduling time (an TTI) to send an uplink transmission block (a PUSCH), and the plurality of UEs randomly select resources to send the PUSCH. The resources randomly selected by the terminal include time-frequency resources and spread spectrum sequences.

Specifically, since the resources are randomly selected by the terminal, the situation where the plurality of terminals selects the same time-frequency resources and even selects the same spread spectrum sequences is inevitable.

For example, in the embodiment, since one scheduling time corresponds to merely one time-frequency resource, the plurality of terminals select one time-frequency resource at the current scheduling time. For the situation of one scheduling time and a plurality of time-frequency resources, the generation manner of the feedback information may also adopt the implementation manner in the embodiment, which is not described herein. In the embodiment, the spread spectrum sequences randomly selected by UEs are not conflicting (two or more users select different spread spectrum sequences), the spread spectrum sequences randomly selected by part UEs may also be conflicting (two or more users select the same spread spectrum sequences), and different UEs select the same time-frequency domain resources.

In step 2, a base station correctly receives transmission blocks (PUSCHs) from the plurality of terminals and determines which terminals which the corresponding feedback information is generated for.

Specifically, the base station receives uplink transmission blocks (PUSCHs) from the plurality of terminals in the same TTI. The base station can determine that a terminal sends a PUSCH in the current TTI merely after correctly receiving an uplink transmission block sent from the terminal. For the transmission blocks which are not correctly received, the base station cannot determine which terminals send PUSCHs. In summary, the base station generates the corresponding feedback information for a correctly received terminal (the base station correctly parses the transmission blocks sent from the terminal).

In step 3, the base station generates the corresponding feedback information according to the correctly received transmission block of the terminal, where the feedback includes a plurality of pieces of bit information.

Specifically, the base station needs to perform a CRC check after receiving the transmission blocks from the terminals in the current TTI. The pass of the CRC check means that the base station correctly receives the transmission blocks. After the CRC check is passed, a base station side stores CRC check sequences corresponding to the transmission blocks. The content of the feedback information may be referred to the specific embodiments 1 to 4. The base station and the terminal have already unified the generation manner of the feedback information.

In step 4, the base station delivers the feedback information to the correctly received transmission blocks from the plurality of terminals in a preset feedback manner.

The feedback manner is that a base station MAC entity delivers the feedback information of a plurality of users through one MAC PDU. FIG. 9 is a schematic diagram of a format of feedback information of N users according to an embodiment of the present disclosure.

The feedback information of each user may individually constitute a MAC CE, and different MAC CEs are arranged in a cascaded manner.

In another example, the feedback information of the plurality of users constitutes a PDU, each user occupies a corresponding number of bytes, and the feedback information of different users adopts the cascaded manner.

FIG. 10 is a schematic diagram 1 of a feedback information MAC PDU according to an embodiment of the present disclosure. FIG. 11 is a schematic diagram of a protocol data unit formed by signal-user feedback information according to an embodiment of the present disclosure. FIG. 12 is a schematic diagram 2 of a feedback information MAC PDU according to an embodiment of the present disclosure. FIG. 13 is a schematic diagram of a PDU formed by multi-user feedback information according to an embodiment of the present disclosure. The related description is shown in FIGS. 9, 10, 11, 12 and 13.

Specifically, the base station side calculates a corresponding RNTI according to a time domain location of a PUSCH where the correctly received uplink transmission block (a PUSCH) from the terminal is located. A PDCCH scrambled by the RNTI calculated by the base station side indicates that a downlink transmission block (a PDSCH) where the feedback information is located is carried.

In step 5, the terminal decodes the PDCCH and decodes the corresponding PDSCH according to the decoded PDCCH. The terminal decodes the PDSCH, submits the PDSCH to the MAC layer, and confirms whether the feedback information of the terminal exists in the MAC CE or the MAC PDU. The terminal confirms the existence of the feedback information of the terminal, and the procedure is stopped; otherwise, go back to the step 1.

Specific Embodiment 8

Figure 20:
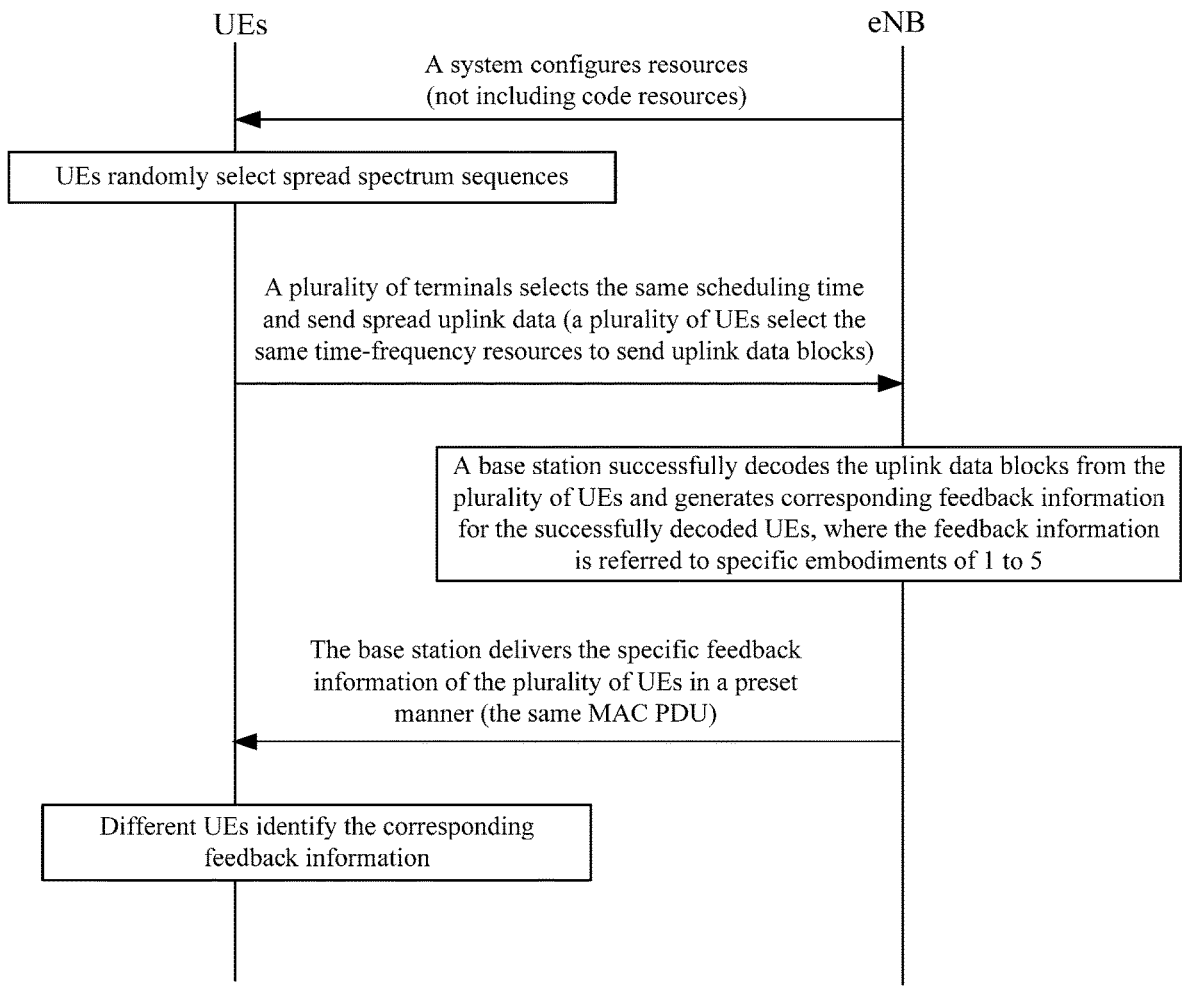
FIG. 20 is a flowchart 8 of a feedback information processing method according to an embodiment of the present disclosure.

FIG. 20 is a flowchart 8 of a feedback information processing method according to an embodiment of the present disclosure. The method includes steps described below.

In step 1, a plurality of terminals (UEs) select the same scheduling time (an TTI) to send an uplink transmission block (a PUSCH), and the plurality of UEs randomly select resources to send the PUSCH. The resources randomly selected by the terminal include only time-frequency resources, and the terminal performs spread spectrum processing according to spread spectrum sequences configured by a system.

For example, in the embodiment, since one scheduling time corresponds to merely one time-frequency resource, the plurality of terminals select one time-frequency resource at the current scheduling time. For the situation of one scheduling time and a plurality of time-frequency resources, the generation manner of the feedback information may also adopt the implementation manner in the embodiment, which is not described herein. In the embodiment, the spread spectrum sequences randomly selected by all UEs are not conflicting (two or more users select different spread spectrum sequences), and different UEs select the same time-frequency domain resources.

In step 2, a base station correctly receives transmission blocks (PUSCHs) from the plurality of terminals and determines which terminals which the corresponding feedback information is generated for.

Specifically, the base station receives uplink transmission blocks (PUSCHs) from the plurality of terminals in the same TTI. The base station can determine that a terminal sends a PUSCH in the current TTI merely after correctly receiving an uplink transmission block sent from the terminal. For the transmission blocks which are not correctly received, the base station cannot determine which terminals send PUSCHs. In summary, the base station generates the corresponding feedback information for a correctly received terminal (the base station correctly parses the transmission blocks sent from the terminal).

In step 3, the base station generates the corresponding feedback information according to the correctly received transmission block of the terminal, where the feedback includes a plurality of pieces of bit information.

Specifically, the base station needs to perform a CRC check after receiving the transmission blocks from the terminal in the current TTI. The pass of the CRC check means that the base station correctly receives the transmission blocks. After the CRC check is passed, a base station side stores CRC check sequences corresponding to the transmission blocks. The feedback information may be referred to the specific embodiments 1 to 5. The base station and the terminal have already unified the generation manner of the feedback information.

In step 4, the base station delivers the feedback information to the correctly received transmission blocks from the plurality of terminals in a preset feedback manner.

The feedback manner is that a base station MAC entity delivers the feedback information of a plurality of users through one MAC PDU. FIG. 9 is a schematic diagram of a format of feedback information of N users according to an embodiment of the present disclosure.

The feedback information of each user may individually constitute a MAC CE, and different MAC CEs are arranged in a cascaded manner.

In another example, the feedback information of the plurality of users constitutes a PDU, each user occupies a corresponding number of bytes, and the feedback information of different users adopts the cascaded manner.

FIG. 10 is a schematic diagram 1 of a feedback information MAC PDU according to an embodiment of the present disclosure. FIG. 11 is a schematic diagram of a protocol data unit formed by signal-user feedback information according to an embodiment of the present disclosure. FIG. 12 is a schematic diagram 2 of a feedback information MAC PDU according to an embodiment of the present disclosure. FIG. 13 is a schematic diagram of a PDU formed by multi-user feedback information according to an embodiment of the present disclosure. The related description is shown in FIGS. 9, 10, 11, 12 and 13.

Specifically, the base station side calculates a corresponding RNTI according to a time domain location of a PUSCH where the correctly received uplink transmission block (a PUSCH) from the terminal is located. A PDCCH scrambled by the RNTI calculated by the base station side indicates that a downlink transmission block (a PDSCH) where the feedback information is located is carried.

In step 5, the terminal decodes the PDCCH and decodes the corresponding PDSCH according to the decoded PDCCH. The terminal decodes the PDSCH, submits the PDSCH to the MAC layer, and confirms whether the feedback information of the terminal exists in the MAC CE or the MAC PDU. The terminal confirms the existence of the feedback information of the terminal, and the procedure is stopped; otherwise, go back to the step 1.

The embodiments of the present disclosure provide a feedback information processing method. The method may provide a correct feedback on correct decoding of the data of the plurality of users in the same time domain or even in the same time-frequency resources. When the data sent from the user occupies the same time-frequency resources or even the same spread spectrum sequences, the base station performs the decoding successfully and may provide the correct feedback for different UEs.

Embodiment 4

The embodiment of the present disclosure further provides a storage medium. Optionally, in the embodiment, the storage medium may be configured to store program codes for executing a step described below.

In step S1, feedback information for a plurality of second nodes is multiplexed in a MAC PDU, where the feedback information is information generated after the first node correctly receives transmission blocks from the second nodes, and the feedback includes a plurality of pieces of bit information.

Optionally, in the embodiment, the storage medium may include, but is not limited to, a USB flash drive, a read-only memory (ROM), a random access memory (RAM), a mobile hard disk, a magnetic disk, an optical disk or another medium capable of storing program codes.

Optionally, in the embodiment, a processor may execute the following step according to the program codes stored in the storage medium: multiplexing the feedback information for the plurality of second nodes in the MAC PDU, where the feedback information is information generated after the first node correctly receives the transmission blocks from the second node, and the feedback includes the plurality of pieces of bit information.

Optionally, for specific examples in the embodiment, reference may be made to the examples described in the above-mentioned embodiments and optional implementation modes, and repetition will not be made herein.

Apparently, it should be understood by those skilled in the art that each of the above-mentioned modules or steps of the present disclosure may be implemented by a general-purpose computing apparatus, the modules or steps may be concentrated on a single computing apparatus or distributed on a network formed by multiple computing apparatuses, and alternatively, the modules or steps may be implemented by program codes executable by the computing apparatuses, so that the modules or steps may be stored in a storage apparatus and executable by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

As described above, the feedback information processing method, device and system, the base station and the terminal have the following benefits: in the related art, for the situation where a plurality of users transmitting respective data using the same time-frequency resource is allowed, and the data of some users may be successfully received by a base station, but the data of other users may not be correctly parsed by the base station, the technical solution solves the problem of a base station being able to provide corresponding feedback information for a user of a successful transmission or a failed transmission.

What is claimed is:

1. A feedback information processing method, comprising:
multiplexing, by a first node, feedback information for a plurality of second nodes in a media access control protocol data unit (MAC PDU), wherein the feedback information is information generated after the first node correctly receives transmission blocks from the plurality of second nodes, and the feedback information comprises a plurality of pieces of bit information;
wherein the bit information comprises: cyclic redundancy check (CRC) check bits generated by the transmission blocks correctly received by the first node, and
wherein after the first node multiplexes the feedback information for the plurality of second nodes in the MAC PDU, a radio network temporary identifier (RNTI) is used in a process that the first node delivers the feedback information to the plurality of second nodes, wherein the RNTI is calculated according to a time domain location of a physical uplink shared channel (PUSCH) where the transmission blocks correctly received by the first node are located.

2. The method of claim 1, wherein the first node forms feedback information for each of the plurality of second nodes into a media access control (MAC) control element (CE), or forms the feedback information for the plurality of second nodes into a protocol data unit (PDU).

3. The method of claim 1, wherein the CRC check bits comprise:
CRC check bits generated by all bits in the transmission blocks correctly received by the first node.

4. The method of claim 1, wherein the bit information is formed by spread spectrum sequences adopted by the first node.

5. A non-transitory storage medium, comprising programs stored in the storage medium, wherein when executed, the programs implement the method of claim 1.

6. A processor, which is configured to execute programs, wherein when executed, the programs implement the method of claim 1.

7. A feedback information receiving method, comprising:
sending transmission blocks from a plurality of second nodes to a first node; and
receiving a media access control protocol data unit (MAC PDU) sent from the first mode, wherein the MAC PDU is obtained through multiplexing feedback information for the plurality of second nodes in one MAC PDU by the first node, the feedback information is information generated after the first node correctly receives the transmission blocks, and the feedback information comprises a plurality of pieces of bit information;
wherein the bit information comprises: cyclic redundancy check (CRC) check bits generated by the transmission blocks correctly received by the first node, and
wherein after the first node multiplexes the feedback information for the plurality of second nodes in the MAC PDU, a radio network temporary identifier (RNTI) is used in a process that the first node delivers the feedback information to the plurality of second nodes, wherein the RNTI is calculated according to a time domain location of a physical uplink shared channel (PUSCH) where the transmission blocks correctly received by the first node are located.

8. The method of claim 7, wherein the CRC check bits comprise:
CRC check bits generated by all bits in the transmission blocks correctly received by the first node.

9. A non-transitory storage medium, comprising programs stored in the storage medium, wherein when executed, the programs implement the method of claim 7.

10. A processor, which is configured to execute programs, wherein when executed, the programs implement the method of claim 7.

11. A base station, comprising:
a processor and a memory storing processor-executable instructions, wherein when the instructions are executed by the processor, the processor executes a following operation: multiplexing feedback information for a plurality of terminals in a media access control protocol data unit (MAC PDU), wherein the feedback information is information generated after the base station correctly receives transmission blocks from the plurality of terminals, and the feedback comprises a plurality of pieces of bit information;
wherein the bit information comprises: cyclic redundancy check (CRC) check bits generated by the transmission blocks correctly received by the first node, and
wherein after the feedback information for the plurality of terminals is multiplexed in the MAC PDU, the processor further executes a following operation: using a radio network temporary identifier (RNTI) in a process that the feedback information is delivered to the plurality of terminals, wherein the RNTI is calculated according to a time domain location of a physical uplink shared channel (PUSCH) where the transmission blocks correctly received by the base station are located.

12. The base station of claim 11, wherein the first node forms feedback information for each of the plurality of second nodes into a media access control (MAC) control element (CE), or forms the feedback information for the plurality of second nodes into a protocol data unit (PDU).

13. A terminal, comprising:
a processor and a memory storing processor-executable instructions, wherein when the instructions are executed by the processor, the processor executes the feedback information processing method of claim 1, wherein after the feedback information for the plurality of base stations is multiplexed in the MAC PDU, the processor further executes a following operation: using a radio network temporary identifier (RNTI) in a process that the feedback information is delivered to the plurality of base stations, wherein the RNTI is calculated according to a time domain location of a physical uplink shared channel (PUSCH) where the transmission blocks correctly received by the terminal are located.

14. The terminal of claim 13, wherein the CRC check bits comprise:
the CRC check bits generated by all bits in the transmission blocks correctly received by the terminal.

* * * * *